United States Patent
Yoshida et al.

(10) Patent No.: US 7,006,429 B2
(45) Date of Patent: Feb. 28, 2006

(54) TRANSMITTER, RECEIVER AND TRANSMITTING METHOD IN MULTI-CARRIER TRANSMISSION SYSTEM

(75) Inventors: Makoto Yoshida, Kawasaki (JP); Eizou Ishizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 940 days.

(21) Appl. No.: 10/072,065

(22) Filed: Feb. 8, 2002

(65) Prior Publication Data

US 2002/0089923 A1    Jul. 11, 2002

Related U.S. Application Data

(63) Continuation of application No. PCT/JP99/05390, filed on Sep. 30, 1999.

(51) Int. Cl.
| | |
|---|---|
| H04L 12/28 | (2006.01) |
| H04L 27/28 | (2006.01) |
| H04B 7/208 | (2006.01) |
| H04K 1/10 | (2006.01) |

(52) U.S. Cl. .................. 370/208; 370/344; 370/431; 375/260; 375/295

(58) Field of Classification Search ........ 370/205–208, 370/343–431, 468–482, 510; 375/260–295, 375/298–364, 259–285
See application file for complete search history.

(56) References Cited

U.S. PATENT DOCUMENTS

| | | | | |
|---|---|---|---|---|
| 5,329,552 A | * | 7/1994 | de Couasnon et al. | 375/295 |
| 5,381,449 A | | 1/1995 | Jasper et al. | |
| 5,710,990 A | * | 1/1998 | Long et al. | 455/103 |
| 6,307,892 B1 | * | 10/2001 | Jones et al. | 375/296 |
| 6,424,678 B1 | * | 7/2002 | Doberstein et al. | 375/260 |
| 6,445,747 B1 | * | 9/2002 | Jafarkhani et al. | 375/285 |
| 6,678,335 B1 | * | 1/2004 | Yoshida | 375/295 |
| 6,853,632 B1 | * | 2/2005 | Verma et al. | 370/343 |
| 2004/0101061 A1 | * | 5/2004 | Yoshida | 375/260 |
| 2004/0146115 A1 | * | 7/2004 | Feng et al. | 375/260 |

FOREIGN PATENT DOCUMENTS

| | | |
|---|---|---|
| EP | 0 786 890 | 7/1997 |
| JP | 6-30069 | 2/1994 |
| WO | 97/26743 | 7/1997 |

OTHER PUBLICATIONS

S.J Shepherd, et al.. "Simple Coding Scheme to Reduce Peak Factor in QPSK Multicarrier Modulation" Electronics Letters, vol. 31, No. 14, pp. 1131-1132, Jul. 6, 1995.

(Continued)

Primary Examiner—Man U. Phan
(74) Attorney, Agent, or Firm—Katten Muchin Rosenman LLP

(57) ABSTRACT

An object of the present invention is to provide a method for suppressing peak power at a high encoding rate in a multi-carrier transmission system.

The present invention provides a transmitter for transmitting a multi-carrier signal, in which when generating 128 patterns used to suppress the peak power of 8-bit sub-carrier mapping signals from 7-bit information bits in a encoding unit 9, a sub-carrier generation unit 11, for example, divides the signal point of QPSK modulation into orthogonal groups, generates a sub-carrier mapping signal in which a part of sub-carriers is dependent on the signal point of another sub-carrier and a receiver for receiving such a multi-carrier signal.

20 Claims, 21 Drawing Sheets

OTHER PUBLICATIONS

H. Ochiai, et al.. "Performance of Block Codes With Peak Power Reduction for Indoor Multicarrier Systems" IEEE Vehicular Technology Conference, vol. 48, No. 1, pp. 338-342, 1998.

H. Ochiai, et al. "Forward Error Correction Methods for Orthogonal Multicarrier Signals With Dynamic Range Reduction" Proceedings of the 1997 IEICE General Conference, B-5-121, p. 508.

S. Fragiacomo, et al. "Multicarrier Transmission Peak-To-Average Power Reduction Using Simple Block Code" Electronic Letters vol. 34 No. 10, May 14, 1998, p. 953-954.

A.E. Jones, et al., "Block Coding Scheme for Reduction of Peak to Mean Envelope Power Ration of Multicarrier Transmission Schemes" Electronic Letters, vol. 30, No. 25, Dec. 8, 1994, p. 2098-2099.

* cited by examiner

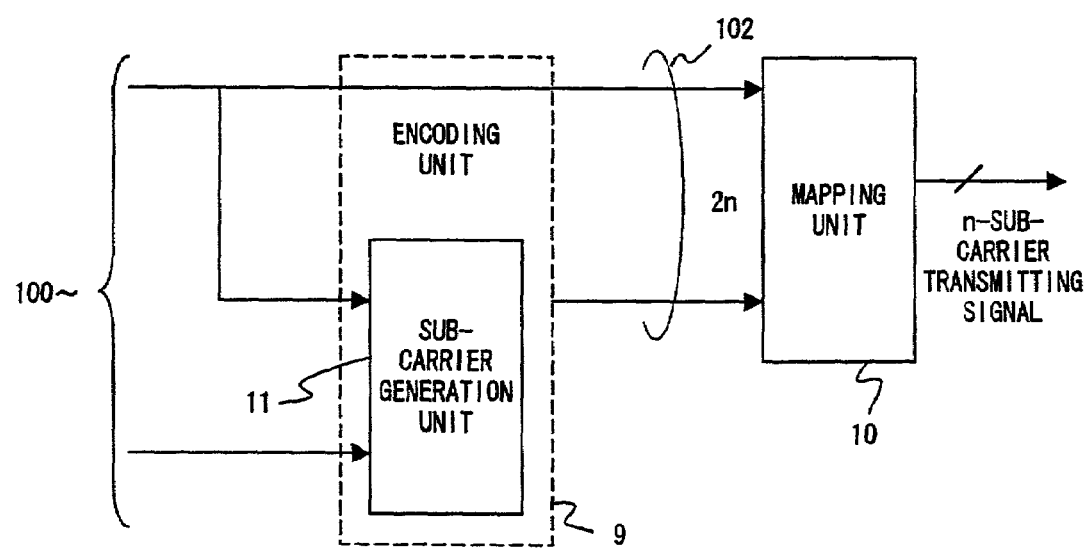
F I G. 1

(1) IN CASE $S_1$ AND $S_2$ BELONG TO THE SAME GROUP
    (a) $S_3=\overline{S}_1$
        $S_4$: AN ARBITRARY SIGNAL POINT
    (b) $S_3=S_1$
        $S_4=\overline{S}_2$
    (c) IN CASE $S_3$ BELONGS TO A DIFFERENT GROUP FROM $S_1$ AND $S_2$
        $S_4=S_2$
    (d) IN CASE $S_3$ BELONGS TO A DIFFERENT GROUP FROM $S_1$ AND $S_2$
        (i) IN CASE $S_1=S_2$
            $S_4=\overline{S}_3$
        (ii) IN CASE $S_1=\overline{S}_2$
            $S_4=S_3$ (2) IN CASE EACH OF $S_1$ AND $S_2$ BELONGS TO A DIFFERENT GROUP
    (a) $S_3=S_1$
        $S_4$: AN ARBITRARY SIGNAL POINT
    (b) $S_3=\overline{S}_1$
        $S_4=S_2$
    (c) IN CASE $S_3$ BELOGNS TO THE SAME SIGNAL POINT GROUP AS $S_2$
        $S_4=\overline{S}_2$
    (d) $S_3=S_2$
        $S_4=S_1$
    (e) $S_3=\overline{S}_2$
        $S_4=\overline{S}_1$

FIG. 3

| PHASE CONDITIONS | | NUMBER OF PATTERNS | TOTAL NUMBER OF PATTERNS |
|---|---|---|---|
| (1) | (a) | 4 | 9 |
| | (b) | 1 | |
| | (c) | 2 | |
| | (d) (i) | 2 | |
| | (d) (ii) | 2 | |
| (2) | (a) | 4 | 9 |
| | (b) | 1 | |
| | (c) | 2 | |
| | (d) | 1 | |
| | (e) | 1 | |

F I G. 6

| NUMBER OF SUB-CARRIERS | PEAK POWER SUPPRESSION AMOUNT [dB] |
|---|---|
| 4 | 2.04 |
| 8 | 1.95 |
| 12 | 2.04 |

F I G. 7

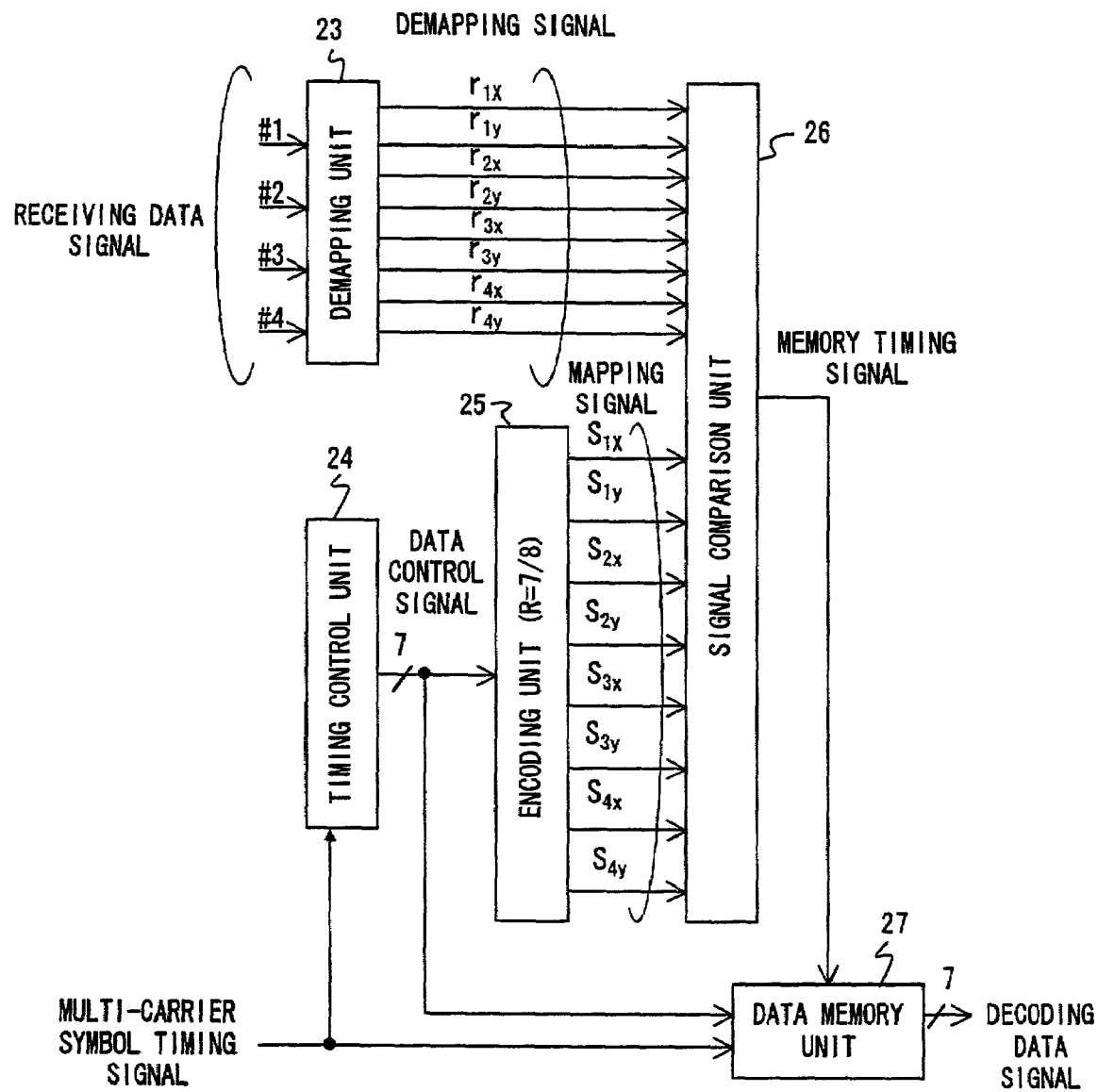
F I G. 1 1

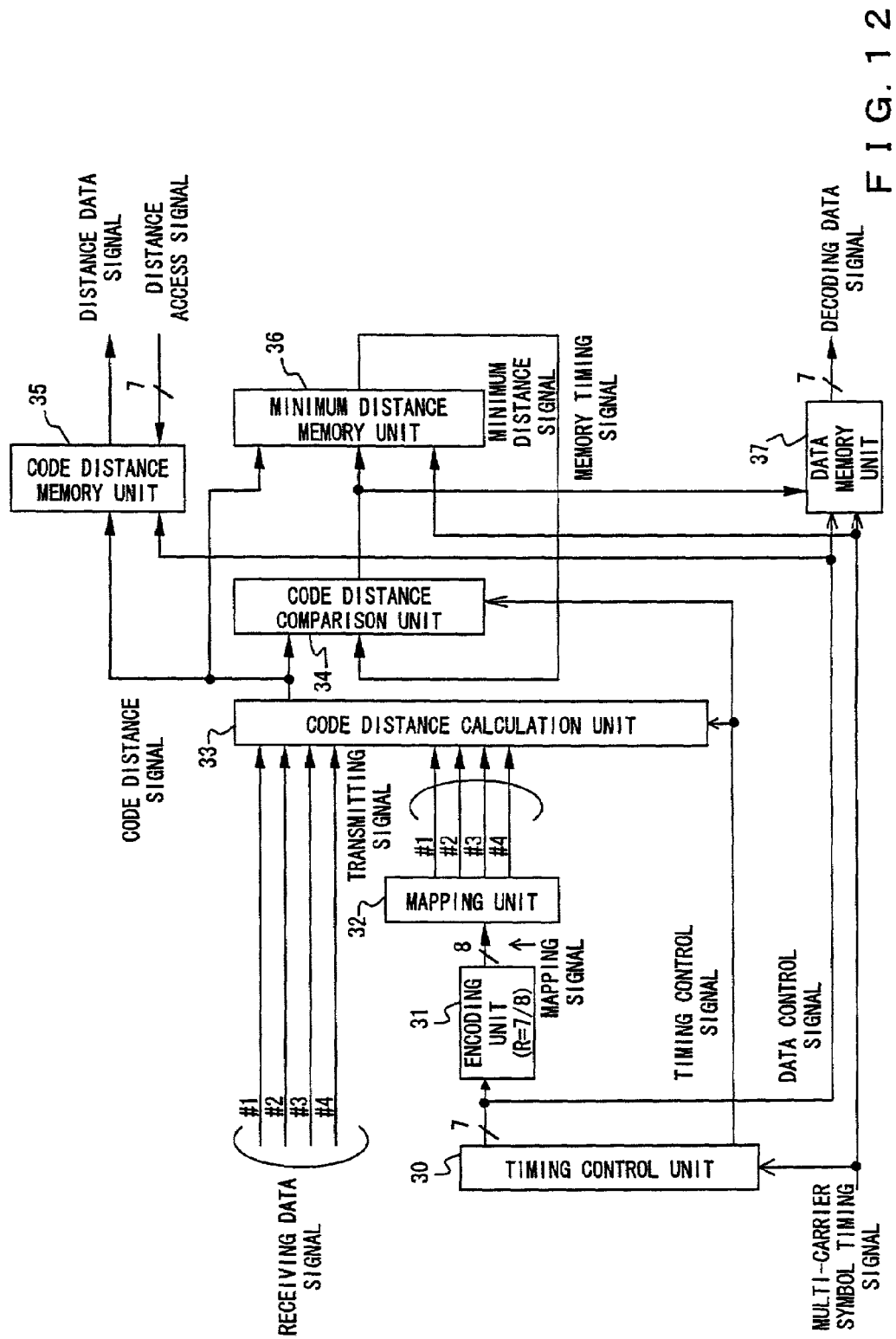

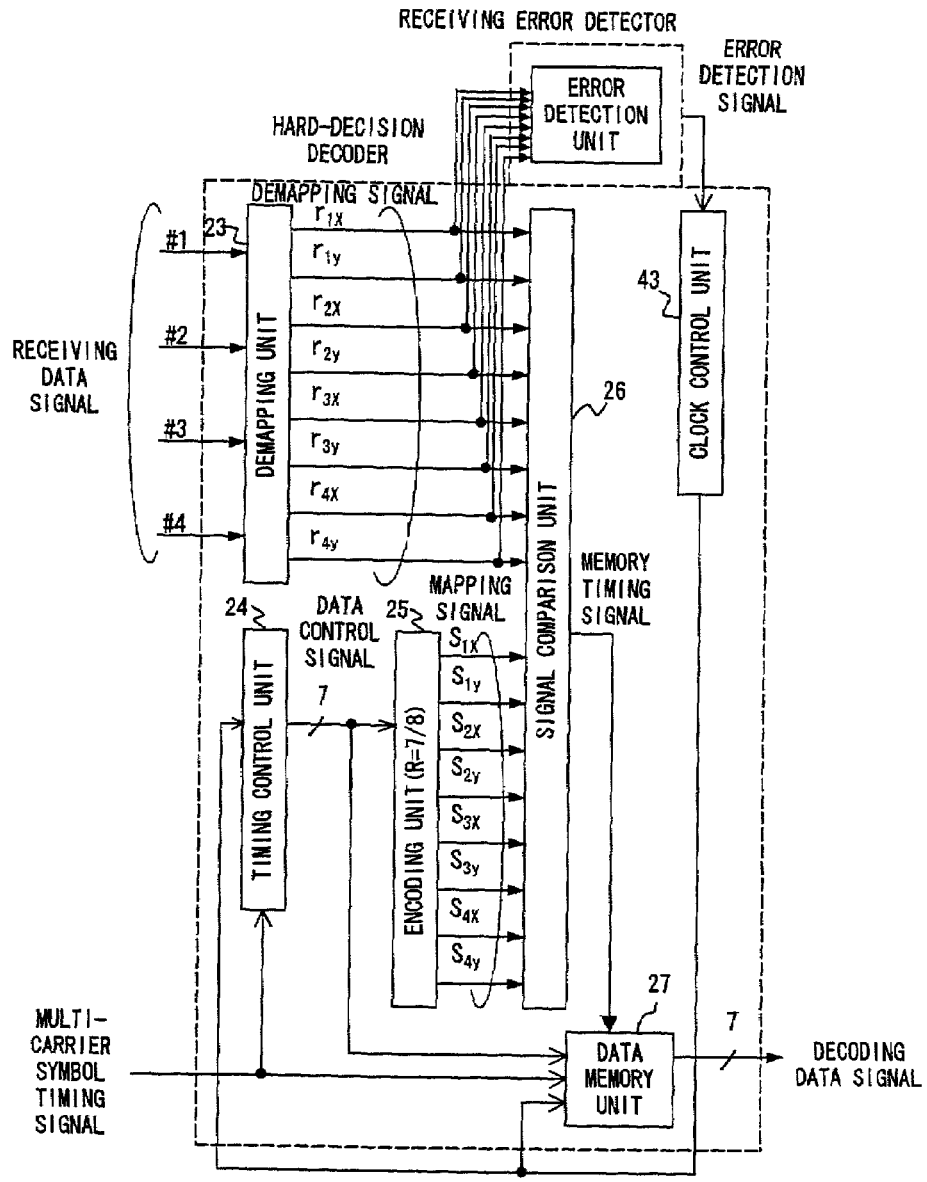
F I G. 15

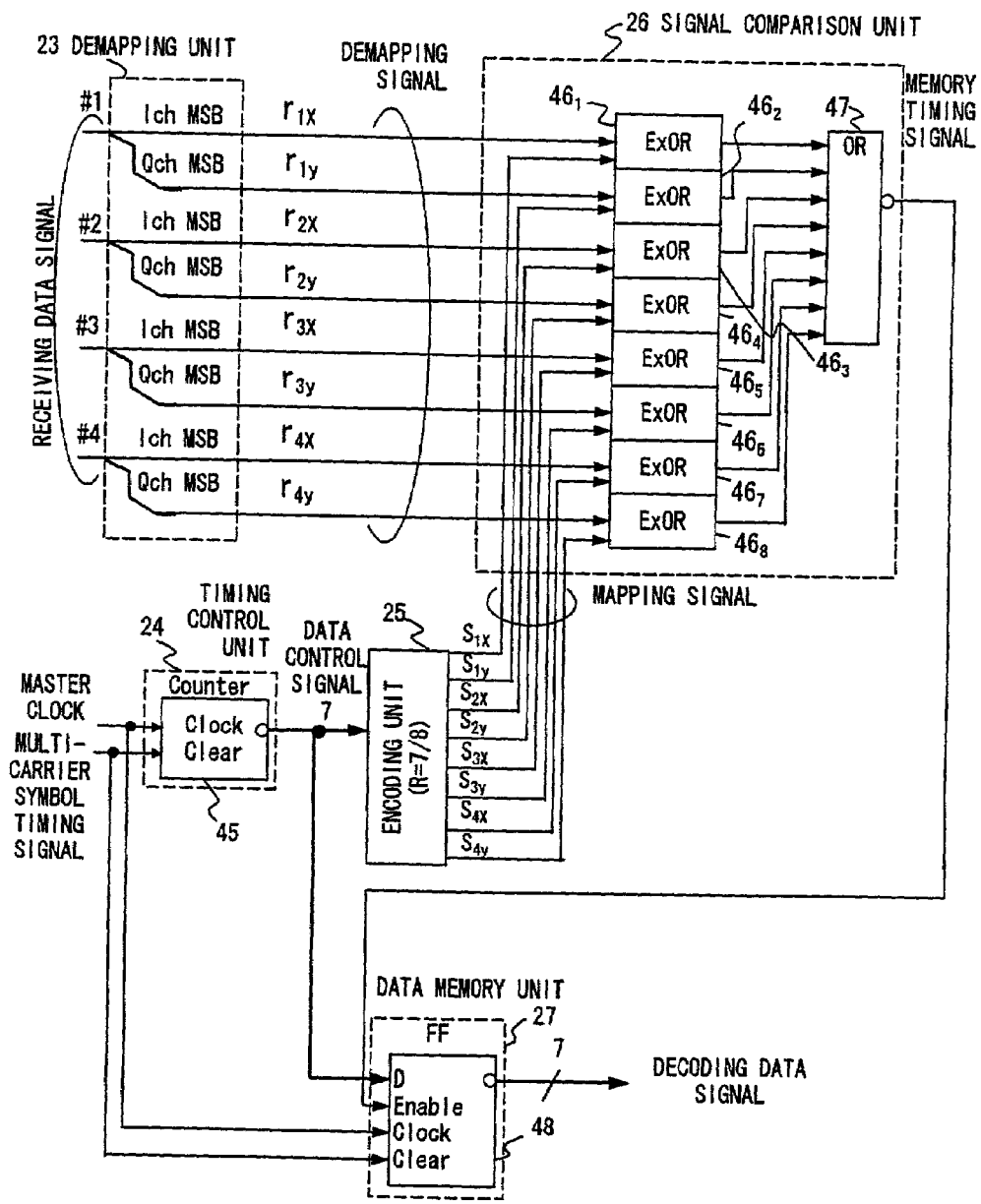
F I G. 16

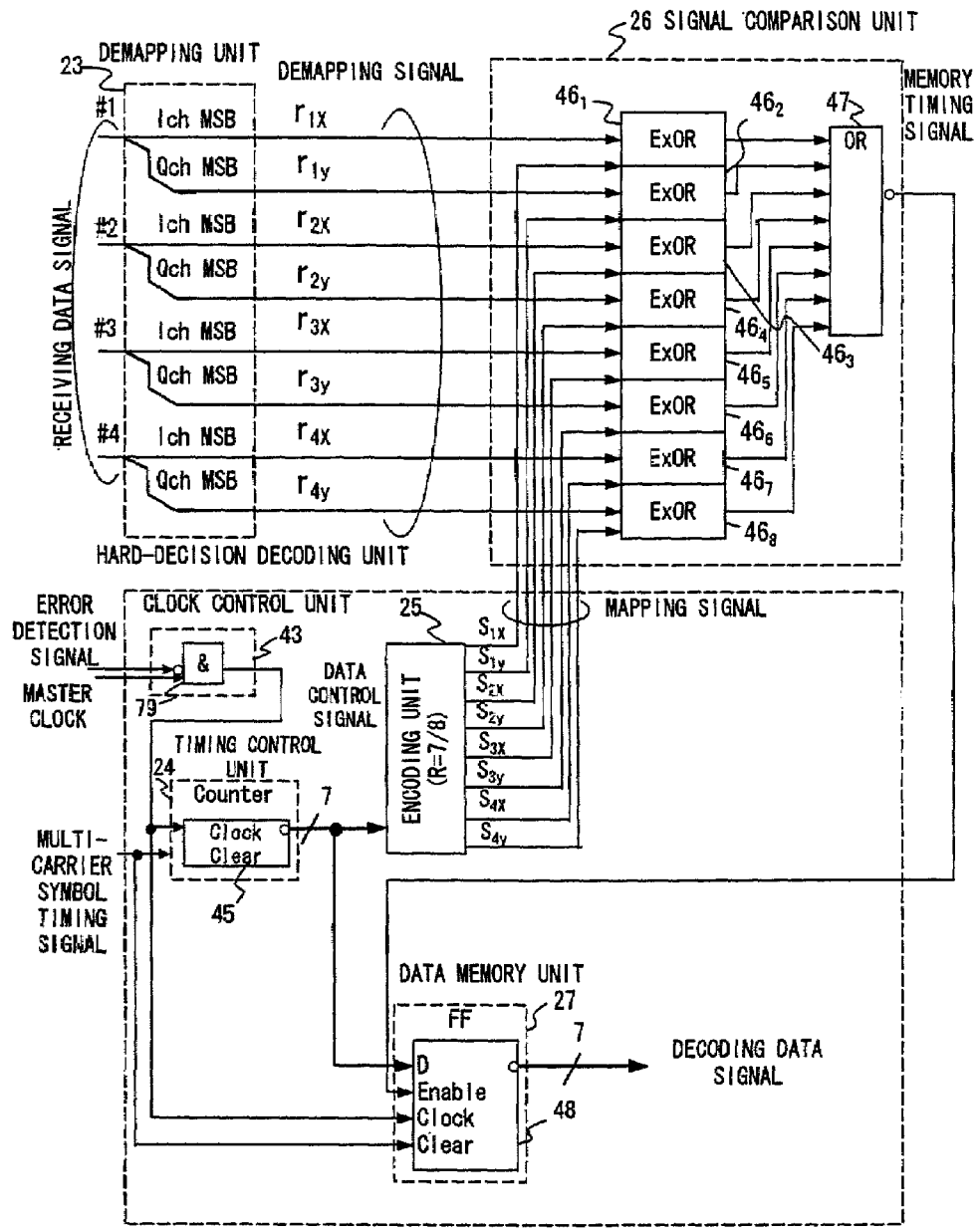
F I G. 20

MULTI-CARRIER
MODULATION

ORTHOGONAL
FREQUENCY-DIVISION
MULTIPLEX

TRANSMITTER, RECEIVER AND TRANSMITTING METHOD IN MULTI-CARRIER TRANSMISSION SYSTEM

CROSS REFERENCE TO RELATED APPLICATION

This application is a continuation of international PCT application No. PCT/JP99/05390 filed on Sep. 30, 1999.

BACKGROUND OF THE INVENTION

1. Field of the Invention

The present invention relates to a multi-carrier transmission system for conducting communications by dividing a transmission band into a plurality of sub-carriers and is one of several broadband wireless communications systems, and more specifically, relates to a transmitter, a receiver and a transmitting method for encoding in such a way that the peak power of a transmitting signal can be suppressed in a multi-carrier transmission system for conducting communications by a QPSK-modulation method for mapping each sub-carrier using a complex signal point expressed by two bits.

2. Description of the Related Art

In broadband wireless communications, frequency-selective fading due to multi-path degrading circuit quality is especially problematic. As a modulation method that has an excellent multi-path-proof fading characteristic, a multi-carrier transmission system shown in FIG. 21 is known. In this system, since a frequency-diversity effect can be obtained against frequency-selective fading by dividing a transmission band into a plurality of carriers (called "sub-carriers") high-quality wireless transmission is possible. The orthogonal frequency-division multiplex (OFDM) technology shown in FIG. 22 is also one form of this system.

One of the problems of the multi-carrier technology is the increase of the peak power (or peak-to-average power ratio) of a transmitting signal. To compensate for the linearity of the system, a wide-range linear amplifier is needed. However, this amplifier is expensive and the power efficiency is low. If a cheap amplifier is used, non-linear distortion is caused by using a saturation region, and the characteristic degrades, which is a problem. For this reason, the technology cannot be put into practical use yet.

The solution of this problem is largely classified into two methods: (1) the restriction of input signals and (2) the restriction of output signals. The former method prevents a signal pattern in which peak power is increased by an encoding process, from occurring and causes no characteristic degradation. Furthermore, if those codes can extend the minimum distance, the receiving characteristic (bit error rate (BER)) can also be improved. The latter method, for example, by utilizing the fact that the occurrence probability of a signal pattern for generating a peak power is low, compulsorily cuts peak power using a specific threshold value when the peak power exceeds the threshold value, which corresponds to clipping and the like. This technology increases a side-lobe level due to non-linear distortion, that is, it causes inter-carrier interference. Thus, the latter method degrades the characteristic. Although there is a method for normalizing the entire envelope level of a signal into a threshold level, eventually the S/N is degraded. Therefore, the method also degrades the characteristic. To implement broadband and high-quality wireless transmission, the former method is recommended.

As a peak suppression code, a complementary code is well known, and the application of the code to a multi-carrier modulation system is being studied. This code is applicable to a multi-phase modulation (M-ary PSK (MPSK)). In the case of N sub-carriers, this code also provides an encoding rate of $R=(\log_2 N+1)/N$, a minimum code distance of $d_{min}(\sqrt{(N/2)})$ d and a peak power amount of $P_{gain}=2/N\ P(N)$. In this case, d and P(N) ($=N^2$) represent a distance between signals and peak power in N sub-carriers, respectively. For example, in the case of four sub-carriers, $R=\frac{3}{4}$, $d_{min}=\sqrt{2}d$ and $P_{gain}=1/2P(2)$, and in the case of eight sub-carriers, $R=\frac{1}{2}$, $d_{min}=2d$ and $P_{gain}=1/4P(4)$. Since the encoding rate decreases in proportion to the number of sub-carriers, the reduction of transmission efficiency cannot be avoided even if the improvement of error correction capability is taken into consideration. By replacing eight sub-carriers with two sets of four sub-carriers, an eight-sub-carrier system can be operated as two four-sub-carrier systems. However, even in this case, $R\leq\frac{3}{4}$ and the encoding rate cannot be further increased.

The encoding rate, minimum distance and peak power amount described above are disclosed, for example, in the following reference.

R. D. J. van Nee, "OFDM Codes for Peak-to-Average Power Reduction and Error Correction", IEEE Globecom 96, London, p.740–744 (November 1996).

Since the encoding technology includes a non-linear operation, it is difficult to implement the technology by a logic circuit and an accordingly implementation method using a look-up-table is mainly adopted. Therefore, the encoding technology is not suited for high-speed signal processing, which is a problem.

An object of the present invention is to provide a transmitter, a receiver and a transmitting method for conducting high-performance wireless transmission by not using a signal point pattern which increases the peak power of a transmitting signal, as a signal point pattern which is the base of a multi-carrier transmitting signal and, for example, by performing communications encoding for suppressing the peak power to approximately 2 dB at a high encoding rate (for example, $R=\frac{7}{8}$) in view of the problem described above. Another object of the present invention is to realize a high speed by implementing the encoding by hardware.

SUMMARY OF THE INVENTION

The present invention provides a transmitter in a multi-carrier transmission system for conducting communications using a modulation system for dividing a transmission band into a plurality of sub-carriers and, for example, mapping each carrier by a complex signal point expressed by k bits. The transmitter comprises an encoding unit converting transmission data information of the number of bits less than kn bits, which are data for expressing n sub-carriers, into a signal point pattern with the small peak power of a transmitting signal of signal point patterns expressed by the kn bits, the encoding unit composed of signal points, in which the signal point pattern with the small peak power is divided into two orthogonal groups in four quadrants of an IQ plane and having a sub-carrier generation unit for generating sub-carriers in which the signal point of a part of sub-carriers has a prescribed correlation with the signal point of other sub-carriers, and a mapping unit for generating the transmitting signals of n sub-carriers using the output of the encoding unit. However, since it can be considered that the two orthogonal groups are a group, including the first and third quadrants of the IQ plane and a group, including the second and fourth quadrants, the present invention is also applicable to a modulation system other than QPSK.

The sub-carrier generation unit generates a sub-carrier with a phase condition in which a part of the signal point of 2 k signal points of a modulation signal being dependent on a signal point of other sub-carriers, as a sub-carrier having the prescribed collation described above.

The sub-carrier generation unit generates a sub-carrier in which, of the four signal points of a QPSK signal, the signal point of a part of the sub-carriers is dependent on the signal point of another sub-carrier.

The encoding unit suppresses peak power to 2 dB at an encoding rate of ⅞ by generating eight sub-carrier mapping signals from seven information bits.

The present invention provides a receiver in a multi-carrier transmission system for conducting communications using a modulation system for dividing a transmission band into a plurality of sub-carriers and, for example, mapping each carrier by a complex signal point expressed by k bits. The receiver comprises a hard decision decoding unit comprising a demapping unit converting a receiving signal transmitted from the transmitting side, which is obtained by converting transmission data information of the number of bits less than kn bits, which are data for expressing n sub-carriers, into a signal point pattern with the small peak power of a transmitting signal, of signal point patterns expressed by the kn bits, a mapping signal generation unit generating all signal point patterns which might be transmitted from a transmitting side, and a hard-decision decoding unit further comprising a comparison unit comparing the signal point pattern outputted from the demapping unit with the signal point pattern outputted from the mapping signal generation unit and an output unit outputting data corresponding to one signal point pattern, in which the signal point pattern outputted from the demapping unit and the signal point pattern outputted from the mapping signal generation unit are matched, as a decoding data signal.

The mapping signal generation unit comprises a timing control unit, including a counter sequentially generating an information bit of less than 2 k bits when decoding n sub-carriers, and an encoding unit, inputting the information bit outputted from the timing control unit, and converting the information bit into a signal point pattern with the small peak power of a transmitting signal, of signal point patterns expressed by 2 k bits, the encoding unit composed of signal points in which the signal point pattern with the small peak power is divided into two orthogonal groups in four quadrants of an IQ plane, comprising a signal point in which a signal point corresponding to each sub-carrier has a prescribed correlation, and a sub-carrier generator. However, since it can be considered that the two orthogonal groups are a group, including the first and third quadrants of the IQ plane, and a group, including the second and fourth quadrants, the present invention is also applicable to a modulation system other than QPSK.

The receiver further comprises a transmission error detection unit detecting a transmission error when detecting a receiving signal that does not belong to any of signal point patterns which might be transmitted from a transmission side, of the outputs of the demapping unit and a decoding operation stoppage control unit stopping a decoding operation by the hard-decision decoding unit when the transmission error detection unit detects a transmission error.

The present invention provides a receiver in a multi-carrier transmission system for conducting communications using a modulation system in which a transmission band is divided into a plurality of sub-carriers and, for example, each carrier is mapped by a complex signal point expressed by k bits. The receiver comprises a demapping unit, converting a receiving signal transmitted from the transmitting side by a sub-carrier in which transmission data information of the number of bits less than kn bits is converted into a signal point pattern with the small peak power of a transmission power out of signal point patterns expressed by the kn bits, in which the signal point pattern with the small peak power is composed of signal points to be divided into two orthogonal groups in four quadrants of an IQ plane and in which the signal point of a part of the sub-carriers has a prescribed correlation with the signal point of other sub-carriers, into a demapping signal used to compare the receiving signal with all the signal point patterns that might be transmitted from the transmitting side, and a transmission error detection unit, detecting a transmission error when detecting in the output of the demapping unit a receiving signal that does not belong to any of the signal point patterns which might be transmitted from the transmission side.

The present invention provides a receiver in a multi-carrier transmission system for conducting communications using a modulation system in which a transmission band is divided into a plurality of sub-carriers and, for example, each carrier is mapped by a complex signal point expressed by k bits. The receiver comprises a soft decision decoding unit further comprising, a mapping unit, mapping to convert all the signal point patterns which are expressed by kn bits in relation to n sub-carriers and might be transmitted from the transmitting side, into the respective transmitting signals of the n sub-carriers as on the transmitting side and outputting a transmission available signal, and an output unit, outputting a signal point pattern before the mapping of a transmission available signal with the shortest code distance of the code distances between both a receiving signal transmitted from the transmitting side by a sub-carrier in which transmitting data information of the number of bits less than kn bits is converted into a signal point pattern with the small peak power of a transmission power of signal point patterns expressed by the kn bits, in which the signal point pattern with the small peak power is composed of signal points to be divided into two orthogonal groups in four quadrants of an IQ plane, and in which the signal point of a part of the sub-carriers has a prescribed correlation with the signal point of other sub-carriers and a transmission available signal as a decoding data signal.

The output unit comprises a code distance calculation unit calculating the distance between the receiving data signal and the output of the mapping unit, a minimum distance memory unit storing the minimum code distance, a code distance comparison unit comparing the output of the minimum distance memory unit and the output of the code distance calculation unit and updating the minimum distance unit when the code distance is shorter than the distance stored in the minimum distance memory unit, and a memory unit outputting data corresponding to the minimum distance as decoding data.

The receiver further comprises an error correction decoding unit performing the error correction decoding of a receiving data signal using the code distances between the receiving signal and all the transmission available signals.

The present invention provides a transmitting method in a multi-carrier transmission system for conducting communications using a modulation system in which a transmission band is divided into a plurality of sub-carriers and, for example, each carrier is mapped by a complex signal point expressed by k bits. The transmitting method comprises the steps of generating a sub-carrier in which a signal point pattern with small peak power is composed of signal points to be divided into two orthogonal groups in the four quadrants of an IQ plane and in which the signal point of a part of the sub-carriers has a prescribed correlation with the signal point of other sub-carriers, and generating a transmitting signal by mapping the encoding result.

The present invention provides a receiving method in a multi-carrier transmission system for conducting communications using a modulation system in which a transmission band is divided into a plurality of sub-carriers and, for example, each carrier is mapped by a complex signal point expressed by k bits. The receiving method comprises a hard decision decoding step consisting of demapping step demapping a receiving signal transmitted from the transmitting side by a sub-carrier in which transmission data information of a number of bits less than kn bits is converted into a signal point pattern with the small peak power of a transmission power output of signal point patterns expressed by the kn bits, in which the signal point pattern with the small peak power is composed of signal points to be divided into two orthogonal groups in four quadrants of an IQ plane and in which the signal point of a part of the sub-carriers has a prescribed correlation with the signal point of other sub-carriers, into a demapping signal, mapping signal generation step generating all the signal point patterns which might be transmitted from the transmitting side, comparison step comparing the output of the demapping step with the output of the mapping signal generation step, and output step outputting the transmission data information corresponding to a signal point pattern, the match of which is detected, as a decoding data signal.

The present invention provides a receiving method in a multi-carrier transmission system for conducting communications using a QPSK modulation system in which a transmission band is divided into a plurality of sub-carriers and, for example, each carrier is mapped by a complex signal point expressed by k bits. The receiving method comprises a soft decision decoding step further comprising mapping step mapping to convert all the signal point patterns that are expressed by kn bits in relation to n sub-carriers and might be transmitted from the transmitting side, into the respective transmitting signals of the n sub-carriers, and output step outputting transmission data information corresponding to the signal point pattern before mapping of transmission available signal with the smallest code distance of the code distances between a receiving signal received from the transmitting side by a sub-carrier in which transmission data information of the number of bits less than kn bits is converted into a signal point pattern with the small peak power of a transmission power of signal point patterns expressed by the kn bits, in which the signal point pattern with the small peak power is composed of signal points to be divided into two orthogonal groups in four quadrants of an IQ plane and in which the signal point of a part of the sub-carrier has a prescribed correlation with the signal point of other sub-carriers and transmission available signals as a decoding data signal.

The present invention provides a transmitter in a multi-carrier transmission system for conducting communications using a modulation system in which a transmission band is divided into a plurality of sub-carriers and, for example, each carrier is mapped by a complex signal point expressed by k bits. The transmitter comprises an encoding unit converting transmission data information of the number of bits less than kn bits, which are data for expressing n sub-carriers, into a signal point pattern with the small peak power of a transmitting signal of signal point patterns expressed by the kn bits, the encoding unit further comprising a sub-carrier generation unit generating a sub-carrier, in which the signal point pattern with the small peak power is divided into two orthogonal groups in four quadrants of an IQ plane and the signal point of a part of a sub-carrier has a prescribed correlation with the signal point of other sub-carriers.

The present invention having the configuration described above provides both a transmitter with an encoder implementing a high encoding rate of ⅞ while suppressing peak power to approximately 2 dB and a receiver decoding the transmitted signals by the transmitter.

BRIEF DESCRIPTIONS OF DRAWINGS

FIG. 1 shows the basic configuration of the present invention.

FIG. 3 shows the phase conditions of a four-sub-carrier signal point.

FIG. 6 shows the number of signal point patterns meeting the phase conditions shown in FIG. 3.

FIG. 7 shows respective peak power suppression amounts at each sub-carrier-number.

FIG. 11 shows the configuration of a four-sub-carrier hard decision decoder.

FIG. 12 shows the configuration of a four-sub-carrier soft decision decoder.

FIG. 15 shows the parallel connection between a hard decision decoder and a receiving error detector.

FIG. 16 shows one configuration of a four-sub-carrier hard decision decoder.

FIG. 20 shows one parallel connection between a hard decision decoder and an error correction decoder.

Figure 2:
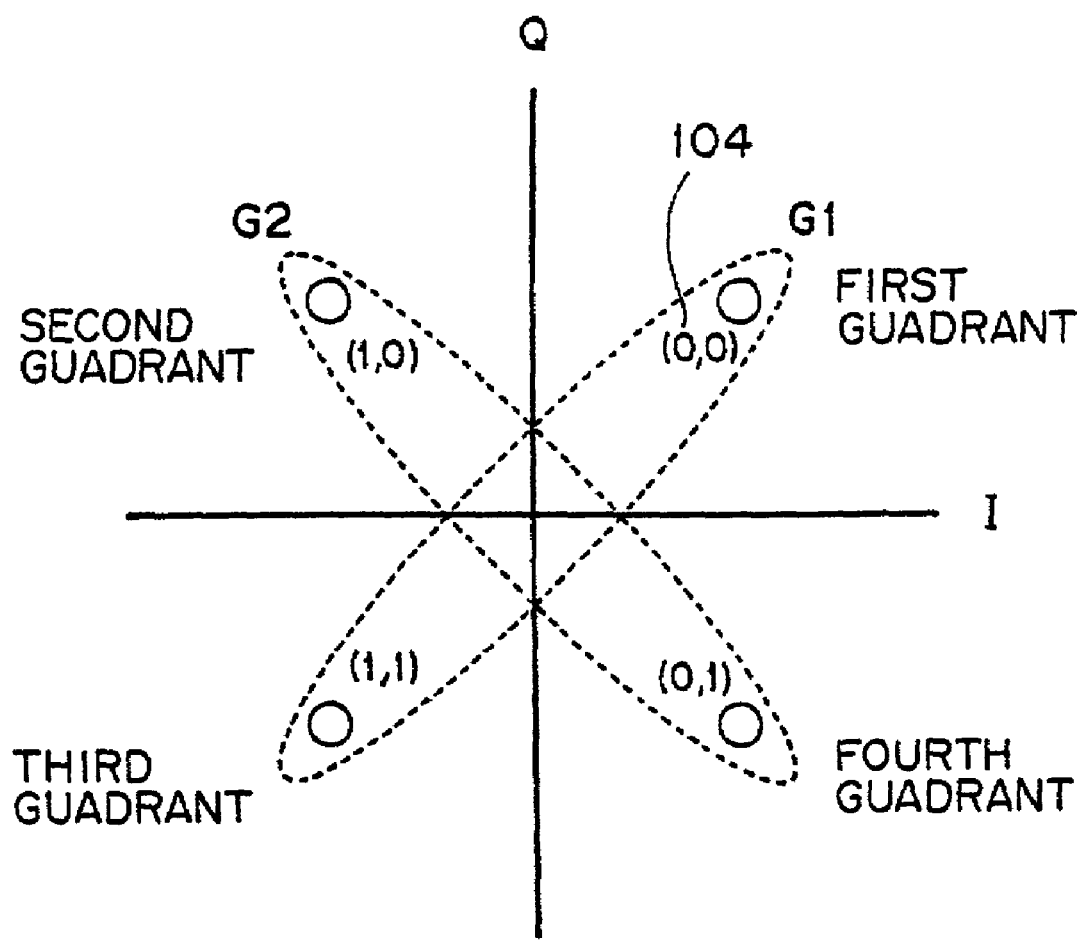
FIG. 2 shows the signal point mapping of QPSK modulation.

For the explanation of the codes, see an attached paper.

DESCRIPTION OF THE PREFERRED EMBODIMENTS

The present invention adopts a peak power suppression encoding system for preventing a signal point pattern, the peak power of which is increased by an encoding process, from occurring in order to suppress the peak power of a transmitting signal. The principle of the present invention is described with reference to FIG. 1.

The present invention provides a transmitter in a multi-carrier transmission system for conducting communications using a QPSK modulation system in which a transmission band is divided into a plurality of sub-carriers and, for example, each carrier is mapped by a complex signal point expressed by two bits. The system comprises an encoding unit converting transmission data information of the number of bits less than 2n bits, which are data for expressing n sub-carriers, into a signal point pattern with the small peak power of a transmitting signal of signal point patterns expressed by the 2n bits, the encoding unit further comprising a sub-carrier generation unit generating both a sub-carrier, in which the signal point pattern with the small peak power is divided into two orthogonal groups in four quadrants of an IQ plane and the signal point of a part of a sub-carrier has a prescribed correlation with the signal point of other sub-carriers, a sub-carrier generation unit 11 generating the transmission signals of n sub-carriers using the output of the encoding unit, and a mapping unit 10 generating the transmitting signals of n sub-carriers using the output of the encoding unit. For example, since when QPSK-modulated signals are transmitted by a four-sub-carrier multi-carrier system, each of the sub-carrier mapping signals of the four sub-carrier transmitting signals is expressed by 8 bits, there are 285 signal point patterns. However, information bits corresponding to the 8-bit sub-carrier mapping signal are designated as 7 bits, and a prescribed correlation between signal points is detected such that 128 signal point patterns can be selected from 256 8-bit signal point patterns to suppress the peak power to 2 dB, which is the theoretical marginal value of peak power in the case of an encoding rate of ⅞, while implementing a high encoding rate of ⅞, and the relation between the 128 signal point patterns and 7-bit information is provided by a logical circuit or a ROM. However, since it can be considered that the two orthogonal groups are a group, including the first and third quadrants of the IQ plane and a group, including the second and fourth quadrants, the present invention is also applicable to a modulation system other than QPSK.

Since a QPSK modulation system is adopted in most currently commercialized wireless systems, such as that for a personal digital cellular (PDC) for a digital portable/car telephone, a PHS, a W-CDMA and the like, it is useful for its commercialization to simplify a circuit by adopting this modulation method. First, assuming a QPSK modulation system, the peak power suppression method in the preferred embodiment of the present invention is described in detail with reference to the drawings.

FIG. 2 shows the mapping of signal points expressed by a complex signal obtained by QPSK-modulating a two-bit digital signal. As shown in FIG. 2, the QPSK-modulated signal points are mapped by a complex signal expressed by two bits $(s_x, s_y)$. The signal points are grouped into two types of signal points $G_1$ and $G_2$. The signal points differ in phase by 180 degrees within the same group and such a group is called a "signal point group" hereinafter. Mapping signals shown in FIG. 2 differ in phase by 180 degrees due to bit inversion ($\overline{Sx}, \overline{Sy}$). In this grouping, generally $G_1$ is in the first and third quadrants, and $G_2$ is in the second and fourth quadrants, and this grouping may be applied to all modulation systems.

The signal points of four sub-carriers, #1, #2, #3 and #4 are $S_1, S_2, S_3$ and $S_4$, respectively. The respective signal points are mapped at a QPSK signal point according to the following equations.

$S_1=(S_{1x}, S_{1y})$ $S_1=(S_{2x}, S_{2y})$ $S_3=(S_{3x}, S_{3y})$ $S_4=(S_{4x}, S_{4y})$

By determining a signal point string $S=\{S_1, S_2, S_3, S_4\}$, that is, a signal point pattern in such a way that the phase relation among signal points $S_1, S_2, S_3$ and $S_4$ can meet the conditions shown in FIG. 3, the peak power can be suppressed as described later. In this example, $\overline{Si}$ (i=1~4) means that a specific signal point differs in phase by 180 degrees from signal point $S_i$, that is, the mapping signals have a bit inversion relation with each other.

Figure 4:
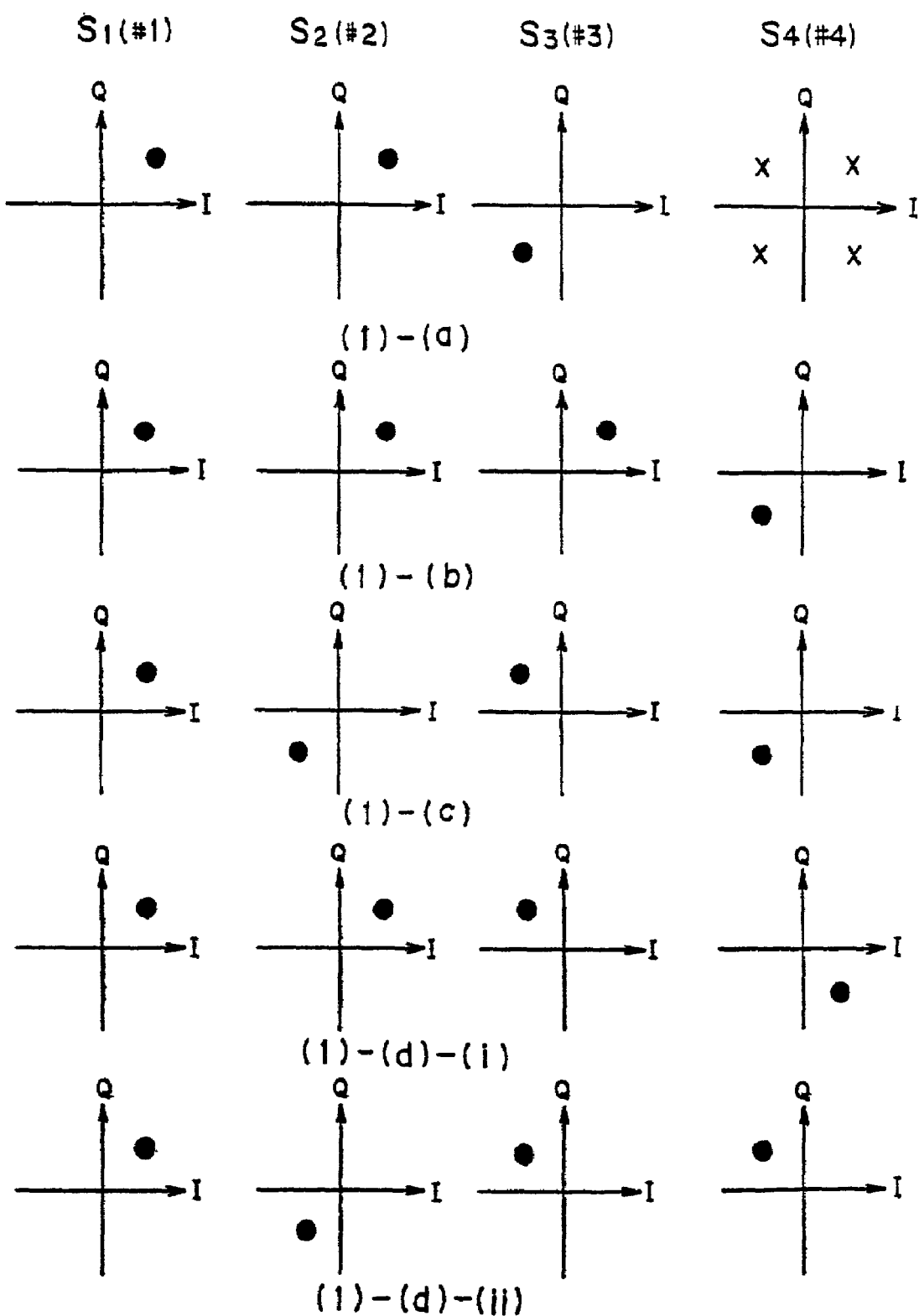
FIG. 4 shows one signal point meeting the phase condition (1) shown in FIG. 3.
Figure 5:
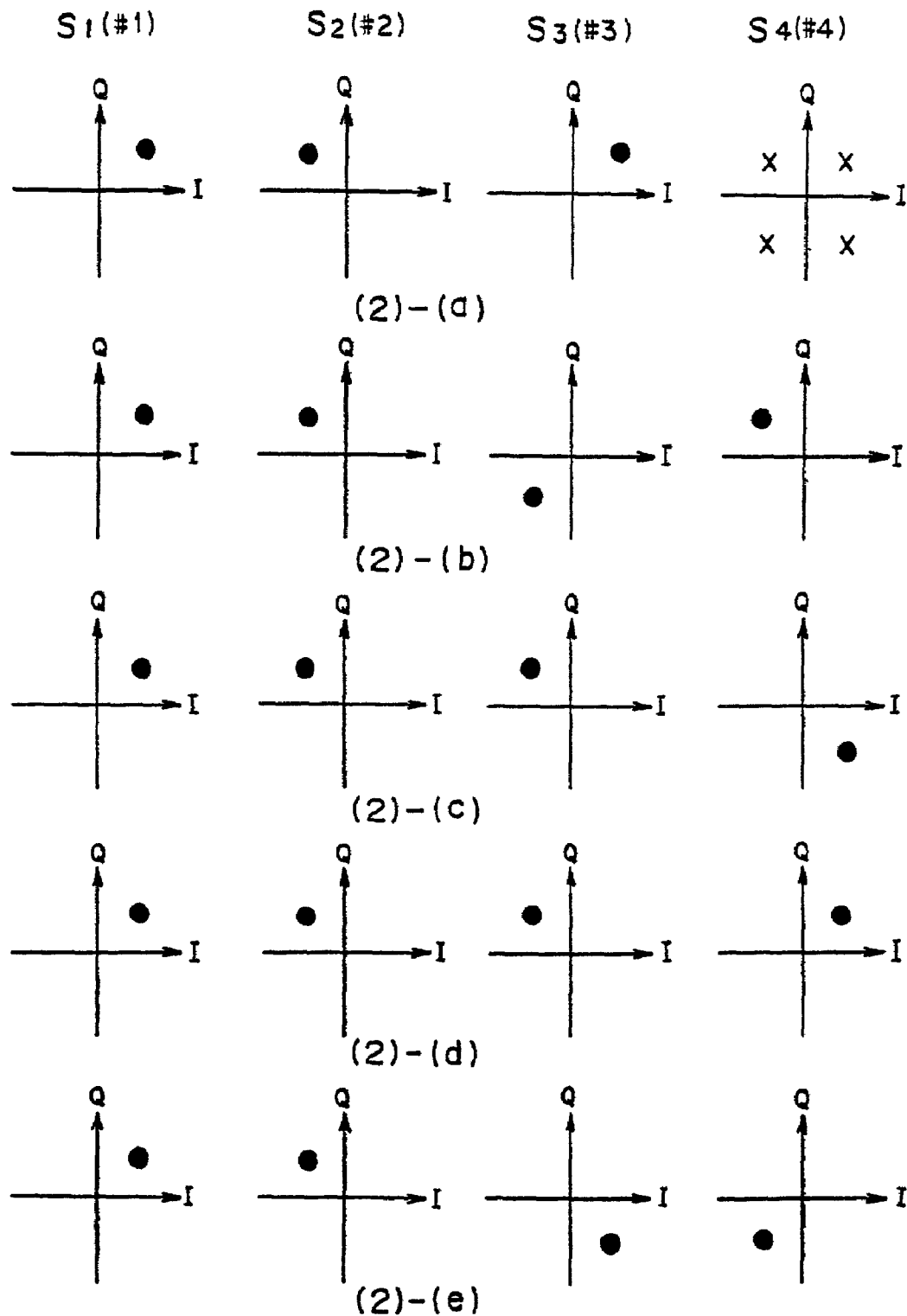
FIG. 5 shows one signal point pattern meeting the phase condition (2) shown in FIG. 3.

As shown in FIG. 3, the following equations hold true.
(1) In case $S_1$ and $S_2$ belong to the same group
 (a) $S_3=\overline{S_1}$
  $S_4$: an arbitrary signal point
 (b) $S_3=S_1$
  $S_4=\overline{S_2}$
 (c) In case $S_3$ belongs to a different group from $S_1$ and $S_2$
  $S_4=S_2$
 (d) In case $S_3$ belongs to a different group from $S_1$ and $S_2$
  (i) In case $S_1=S_2$
   $S_4=\overline{S_3}$
  (ii) In case $S_1=\overline{S_2}$
   $S_4=\overline{S_3}$
(2) In case each of $S_1$ and $S_2$ belongs to a different group
 (a) $S_3=S_1$
  $S_4$: an arbitrary signal point
 (b) $S_3=\overline{S_1}$
  $S_4=\overline{S_2}$
 (c) In case $S_3$ belongs to the same signal point group as $S_2$
  $S_4=\overline{S_2}$
 (d) $S_3=S_2$
  $S_4=S_1$
 (e) $S_3=\overline{S_2}$
  $S_4=\overline{S_1}$ FIGS. 4 and 5 show specific examples of a signal point meeting the phase conditions shown in FIG. 3. FIG. 4 shows signal points meeting the phase condition (1) shown in FIG. 3. In this example, since $S_1$ and $S_2$ belong to the same signal point group, these signal points belong to group $G_1$ shown in FIG. 2. If signal point $S_1$ is located at a point (0, 0) shown in FIG. 2, the signal points met by the phase condition (1)(a) shown in FIG. 3 and described above are shown in FIG. 4(1)-(a). In FIG. 4(1)-(a), signal points $S_1$ and $S_2$ belong to the same signal group $G_1$, signal point $S_3$ is the bit inversion result of signal point $S_1$, $S_4$ is an arbitrary signal point, which can be located at any position marked x.

FIG. 4(1)-(b) shows signal points met by the phase condition (1)(b) shown in FIG. 3 and described above. In this example, $S_1$ and $S_2$ belong to the same signal point group, $S_3$ is the same signal point as $S_2$, and $S_4$ is the bit inversion result of signal point $S_2$. If $S_1$ and $S_2$ are determined, $S_3$ and $S_4$ are uniquely determined.

FIG. 4(1)-(c) shows signal points met by the phase condition (1)(c). In FIG. 4(1)-(c), although $S_1$ and $S_2$ belong to the same signal point group, $S_2$ is the bit inversion result of signal point $S_1$, $S_3$ is a signal point (1, 0) shown in FIG. 2, which belongs to a different signal point group than that of $S_1$ and $S_2$, and $S_4$ is the same signal point as $S_2$. If $S_1$ and $S_2$ are located as shown in FIG. 4(1)-(c), there is also a signal point pattern in which $S_3$ is located at a point (0, 1).

FIG. 4(1)-(d)-(i) shows a signal point pattern met by the phase condition (1)(d)(i). $S_1$ and $S_2$, belongs to signal point group $G_1$, and $S_1=S_2$, $S_3$ belongs to a different signal point group $G_2$ than that of $S_1$ and $S_2$, and $S_4$ is the bit inversion result of $S_3$. FIG. 4(1)-(d)-(ii) shows a signal point pattern met by the phase condition (1)(d)(ii). Although $S_1$ and $S_2$ belong to the same signal point group $G_1$, $S_2$ is the bit inversion result of signal point $S_1$, and $S_3$ belongs to a different signal point group $G_2$ than that of $S_1$ and $S_2$, and $S_4=S_3$. In this example, similarly (c), although only the point (1, 0) shown in FIG. 2 is shown for $S_3$, there is also a signal point pattern corresponding to a point (0, 1) shown in FIG. 2.

FIG. 5 shows other signal point patterns met by the phase condition (2) shown in FIG. 3 and described above. In this example, each of $S_1$ and $S_2$ belongs to a different signal point group. In FIG. 5(2)-(a), signal point $S_4$ can be located at any position marked x as in FIG. 4(1)(a). Although in FIG. 5(2)-(c), $S_3$ is the same signal point as $S_2$, $S_3$ can also be the same as $S_1$. In that sense, if $S_1$ and $S_2$ as located as shown in FIG. 5(2)-(c), there is one more signal point pattern. However, in FIGS. 5(2)-(b), (2)-(d) and (2)-(e), there is only one signal point pattern if $S_1$ and $S_2$ are located as shown in FIGS. 5(2)-(b), (2)-(d) and (2)-(e), respectively.

FIG. 6 shows the number of signal point patterns meeting the phase conditions shown in FIG. 3. The number of all the signal point patterns obtained when signal points $S_1$ and $S_2$ are determined based on the phase conditions shown in FIG. 3 is 18, as shown in FIG. 6. It is detected that the respective number of the patterns of the two remaining sub-carriers $S_3$ and $S_4$ used to suppress the peak power by the phase relation of two sub-carriers $S_1$ and $S_2$ (depending on whether $S_1$ and $S_2$ belong to the same signal point group) is nine. In the case of the condition (1)-(d), either condition (i) or (ii) is selected by the relation between $S_1$ and $S_2$.

In this way, in the preferred embodiment, as shown in FIG. 3, signal point patterns are classified by the conditions (1) and (2), that is, the phase relation between $S_1$ and $S_2$, in other words, signal point groups. Then, signal points $S_3$ and $S_4$ are dependently determined based on the phase relation between $S_1$ and $S_2$ and the peak power is suppressed.

FIG. 3 shows that the number of input information bits to an encoder is, corresponding to the number of code bits 8 (output number of bits), 7.17 bits in total, which is obtained by adding $\log_2 9 \sim 3.17$ bits to select four bits of arbitrary mapping signals composing two sub-carriers $S_1$ and $S_2$, and mapping signals remaining two sub-carriers $S_3$ and $S_4$ from nine pattern signal points. Thus, the theoretical encoding rate (R*) of the encoding method of this preferred embodiment becomes approximately $^{7.17}/_8$. By omitting the figures to the right of the decimal point in order to implement the encoder of the preferred embodiment by a logical circuit, the encoding rate R=⅞ of this preferred embodiment can be obtained.

Specifically, by selecting an arbitrary eight patterns from all nine-candidate patterns, peak power suppression encoding can be performed. In this preferred embodiment, patterns met by condition (b) are eliminated from the phase conditions (1) and (2) shown in FIG. 3, and the respective eight patterns of the phase conditions (1) and (2) are encoded. If the number of sub-carriers is N=4m (m≧2), the peak power is suppressed by dividing all the sub-carriers into groups of four sub-carriers and encoding the sub-carriers in units of four sub-carriers in parallel. FIG. 7 shows the simulation result for peak power suppression amounts for each number of sub-carriers. As a result of the computer simulation, it is shown that peak power is suppressed to approximately 2 dB.

As described above, in this preferred embodiment, each sub-carrier is QPSK-modulated in a multi-carrier modulation system and if the number of sub-carriers N meets the condition N=4m, the peak power is suppressed while the sub-carriers are being encoded at the encoding rate R=⅞ in units of four sub-carriers. By encoding the sub-carriers at the encoding rate R=⅞ using a multi-carrier symbol time, that is, the transmitting/receiving time of 4m sub-carriers, as a unit, the peak power can be suppressed to 2 dB. This peak power suppression amount is a theoretical marginal value at a given encoding rate R=⅞ (QPSK modulation, four carriers). The encoder of this preferred embodiment can be implemented by a fairly simple logical circuit as described later, and can correspond to a high-speed operation.

As described with reference to FIG. 6, each of the total number of patterns corresponding to phase conditions (1) and (2) is eight, except condition (b). This is the number of patterns in the case where, of the signal points, both points $S_1$ and $S_2$ are fixed, and the total number of patterns available as signal point patterns depending on the positions of points $S_1$ and $S_2$ is 128. Specifically, since seven bits are used in total— three bits in order to generate eight patterns and four bits for both $S_1$ and $S_2$.

In this preferred embodiment, of 256 patterns essentially expressed by eight bits, 128 patterns, which is half of the patterns, are selected as signal point patterns, the peak power of which does not become large. In other words, since the number of the patterns is reduced to 128, the peak power becomes small. The condition shown in FIG. 3 is this phase condition, and as shown in FIG. 7, the peak power is suppressed to 2 dB by selecting only signal point patterns meeting this phase condition.

Figure 8:
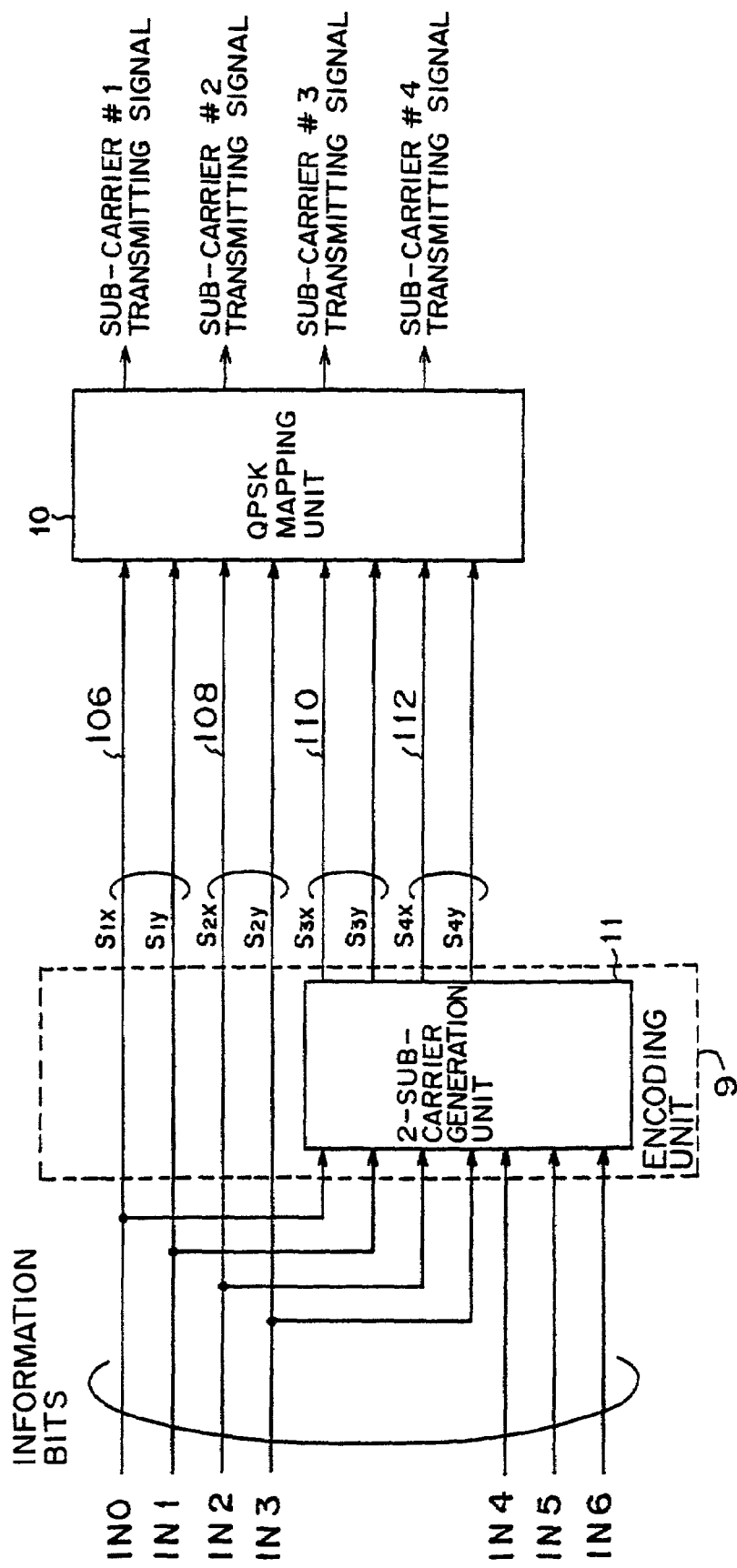
FIG. 8 shows the configuration of a four-sub-carrier encoder.

FIG. 8 shows the basic configuration of an encoder provided on the transmitter side in a four-sub-carrier transmission system. The encoder shown in FIG. 8 outputs the transmitting signals of four sub-carriers #1~#4 against the input of 7- bit information bits IN0~IN6. The encoder comprises a QPSK mapping unit 10, a two-sub-carrier generation unit 11 and an encoding unit 9 enclosed by dotted lines.

The QPSK mapping unit 10 receives the inputs $S_{1x}$, $S_{1y}$, $S_{2x}$, $S_{2y}$, $S_{3x}$, $S_{3y}$, $S_{4x}$ and $S_{4y}$ of an 8-bit sub-carrier mapping signal as information bits and outputs the transmitting signals of four-sub-carriers #1~#4. Of the seven information bits, four bits IN0~IN3 are input as the mapping signals, $S_1=\{S_{1x}, S_{1y}\}$ and $S_2=\{S_{2x}, S_{2y}\}$ of sub-carriers #1 and #2 without any processing and the output of the two-sub-carrier generation unit 11 is provided as the mapping signals of sub-carriers #3 and #4. The QPSK mapping unit 10 maps a mapping signal corresponding to each sub-carrier into the complex signal point (I-channel/Q-channel) described with reference to FIG. 2 and outputs the signal as the transmitting signal of each sub-carrier.

The two-sub-carrier generation unit 11 selects eight types of signal point patterns that are predetermined by the phase conditions shown in FIG. 3 in relation to the position relation between sub-carriers #1 and #2, based on four bits of signals IN0~IN3, which are used as the mapping signals of sub-carriers #1 and #2, that is, mapping signals using three signal bits IN4~IN6 of information bits, and outputs the signals as the mapping signals of sub-carriers #3 and #4. Specifically, although the two-sub-carrier generation unit 11 outputs four bits of mapping signals $S_{3x}$, $S_{3y}$, $S_{4x}$ and $S_{4y}$ of sub-carriers #3 and #4, the patterns are limited to eight types as seen from FIG. 3 if $S_1$ and $S_2$ are determined. Therefore, the patterns correspond to three bits. Then, the encoding unit 9 inputs mapping signals of 128 patterns expressed by seven bits consisting of three bits and four bits of mapping signals of sub-carriers #1 and #2 to the QPSK mapping unit 10. These mapping signals of 128 patterns are selected based on the phase conditions shown in FIG. 3 so as to suppress the peak power when data are output.

Therefore, the present invention divides QPSK signal points into two orthogonal groups and focuses attention on each of the relations between the groups to which four carrier signal points belong.

The two sub-carrier generation unit 11 can be configured by storing the correspondence between an input signal of information bits IN0~IN6 and an output signal of the mapping signals $S_{3x}$, $S_{3y}$, $S_{4x}$ and $S_{4y}$ of sub-carriers #3 and #4 in a memory, such as a RAM, that is, a look-up table. However, in a high-speed and broadband wireless transmission system, there are problems in both speed and scale. If the two-sub-carrier generation unit 11 could be configured using only simple logical circuits, the speed and scale problems can be solved.

Figure 9:
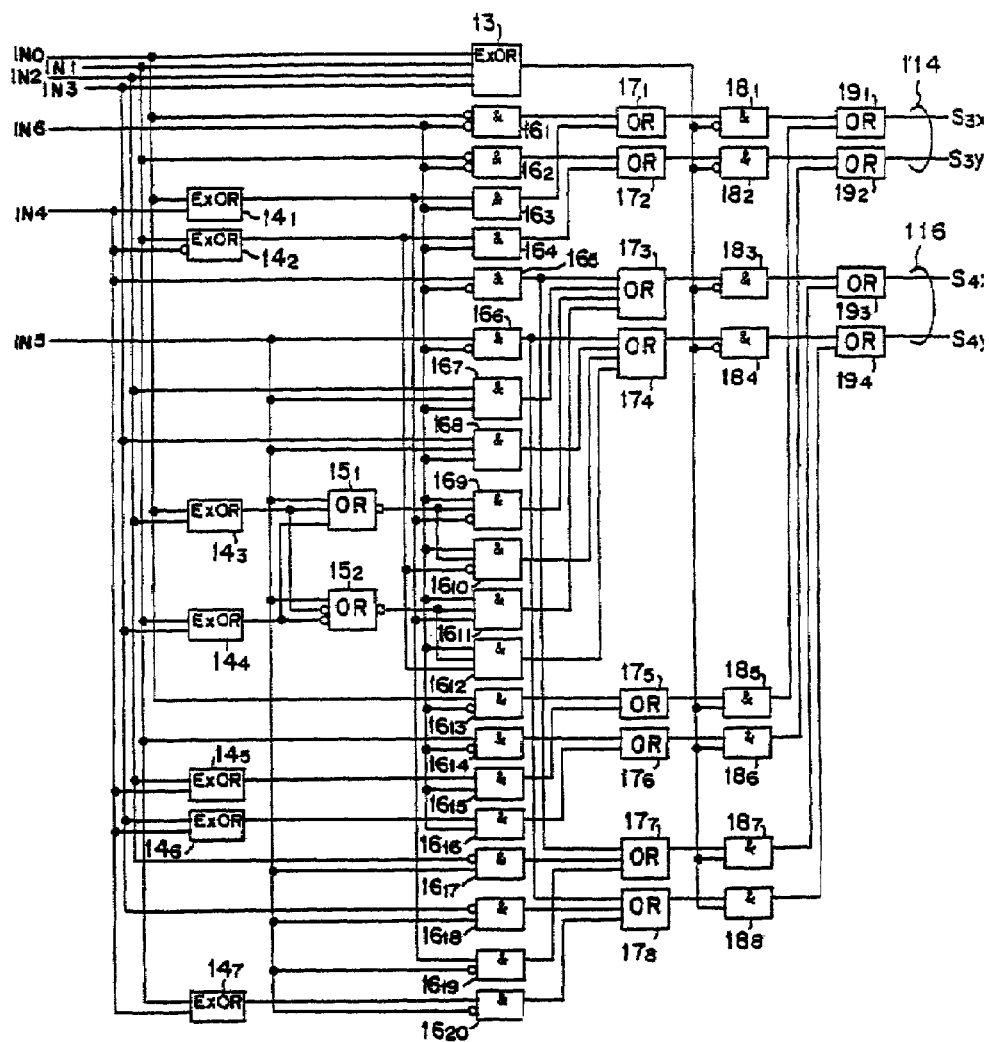
FIG. 9 shows one circuit configuration of a two-sub-carrier generation unit.

This preferred embodiment, for example, selects signal points $S_3$ and $S_4$ from eight types of signal point patterns excluding signal point patterns of condition (b) of the conditions shown in FIG. 3, as signals which are dependent on $S_i$ and $S_2$. FIG. 9 shows one such circuit configuration of the two-sub-carrier generation unit 11. Thus, the two-sub-carrier generation unit 11 can be configured using simple and small-scaled logical circuits.

As shown in FIG. 9, AND $16_1$, $16_2$, $16_5$ and $16_6$ are circuits used to realize condition (1)(a) shown in FIG. 3. IN0 and IN1 provide signal point $S_1$, and IN2 and IN3 provide signal point $S_2$. Signal points $S_1$ and $S_2$ belong to the same signal point group $G_1$, the signal point is, for example, assumed to be (0, 0). Since AND $16_1$ and $16_2$ output 1 when IN6 is 0, the output of OR $19_1$ and $19_2$ become (1, 1). Therefore, signal point $S_3$ becomes $S_3 = \overline{S_1}$. Thus, sub-carrier #3 becomes the bit inversion of sub-carrier #1. Furthermore, since outputs 1 and 0 corresponding to signals 1 and 0 are generated from AND $16_5$ and $16_6$ when IN6=0, respectively, the outputs of OR $19_3$ and $19_4$ can take one arbitrary pattern from (0, 0), (0, 1), (1, 0) and (1, 1). Thus, since signal point S can take an arbitrary signal point, sub-carrier #4 can take an arbitrary signal point.

Similarly, AND $16_3$, $16_4$, $16_7$ and $16_8$ are used to realize phase condition (1)(c) shown in FIG. 3. Similarly, AND $16_3$, $16_4$, $16_9$ and $16_{10}$ are used to realize phase condition (1)(d)(i), and AND $16_3$, $16_4$, $16_{11}$, and $16_{12}$ are used to realize phase condition (1)(d)(ii).

For phase condition (2) shown in FIG. 3, AND $16_5$, $16_6$, $16_{13}$ and $16_{14}$ are used to realize phase condition (2)(a); and AND $16_{15}$ and $16_{16}$, and the middle inputs of OR$17_7$ and $17_8$ are used to realize phase condition (2)(c). AND $16_{15}$ and $16_{16}$, and the lower inputs of OR$17_7$ and $17_8$ are used to realize phase conditions (2)(d) and (2)(e) Next, the circuit shown in FIG. 9 is described in detail using an input of information bits and an output of sub-carrier signals as examples.

IN0~IN6 are information bits and are provided from an information source. When information bits IN4, IN5 and IN6 are 0, 0 and 0, respectively, condition (1)(a) shown in FIG. 3 is selected. When a specific 7-bit information pattern 0011000 is inputted, both 8 bits 00111100 as the component bits of $S_1$, $S_2$, $S_3$ and $S_4$, and a sub-carrier signal are outputted. Since the higher-order four bits (IN0~IN3) of information bits 0011000 pass through the encoding unit, as shown in FIG. 8, 0011 is provided to $S_{1x}$, $S_{1y}$, $S_{2x}$ and $S_{2y}$. Furthermore, since IN6=0, the outputs of AND $16_1$, $16_2$, $16_3$ and $16_4$ are 1, 1, 0 and 0, respectively. Therefore, the outputs of OR circuits $17_1$ and $17_2$ become 1 and 1, respectively. Furthermore, since IN0, IN1, IN2 and IN3 are 0, 0, 1 and 1, respectively, the output of EXOR 13 becomes 0. Therefore, the outputs of OR $17_1$ and $17_2$ are passed as the outputs of AND $18_1$ and $18_2$, respectively, without any processing. The outputs of OR $19_1$ and $19_2$ become 1 and 1, respectively. Thus, $S_3$ is provided for inversion, and $S_{3x}$ and $S_{3y}$ become 1 and 1, respectively. In this case, since IN4 and IN5 are 0 and 0, respectively, the outputs of AND $16_5$ and $16_6$ become 0 and 0, respectively. Since IN6 is 0, the outputs of AND $16_7$, $16_8$, $16_9$, $16_{10}$, $16_{11}$ and $16_{12}$ all become 0. Therefore, the outputs of OR $17_3$ and $17_4$ become 0 and 0, respectively. Accordingly, the outputs of AND $18_3$ and $18_4$ are 0 and 0, respectively.

Then, since IN4 is 0, the output of AND $16_{19}$ is 0. Since IN5 is 0, the output of AND $16_{17}$ is also 0. Since IN0 and IN4 are 0 and 0, respectively, the output of EXOR $14_1$ is 0. Accordingly, the output of AND $16_{19}$ is 0. Since the inputs of OR$17_7$ are 0, 0 and 0, the output is 0. Therefore, the output of AND$18_7$ is 0. Accordingly, the output $S_{4x}$ of OR$19_3$ becomes 0.

Furthermore, since IN5 is 0, the output of AND$16_6$ is 0. Since IN6 is 0, the output of AND$16_{10}$ is 0. Since IN6 is 0, the output of AND $16_{12}$ is 0. Therefore, the output of OR$17_4$ is 0. Since the outputs of AND $18_4$ and OR$19_4$ both are 0, $S_{4y}$ is also 0. Thus, both IN4 and IN5 are provided to $S_{4x}$ and $S_{4y}$ as through bits without any processing. Therefore, these become 0 and 0, respectively, and an output signal becomes 00111100. This corresponds to condition (1)(a) shown in FIG. 3.

Figure 10:
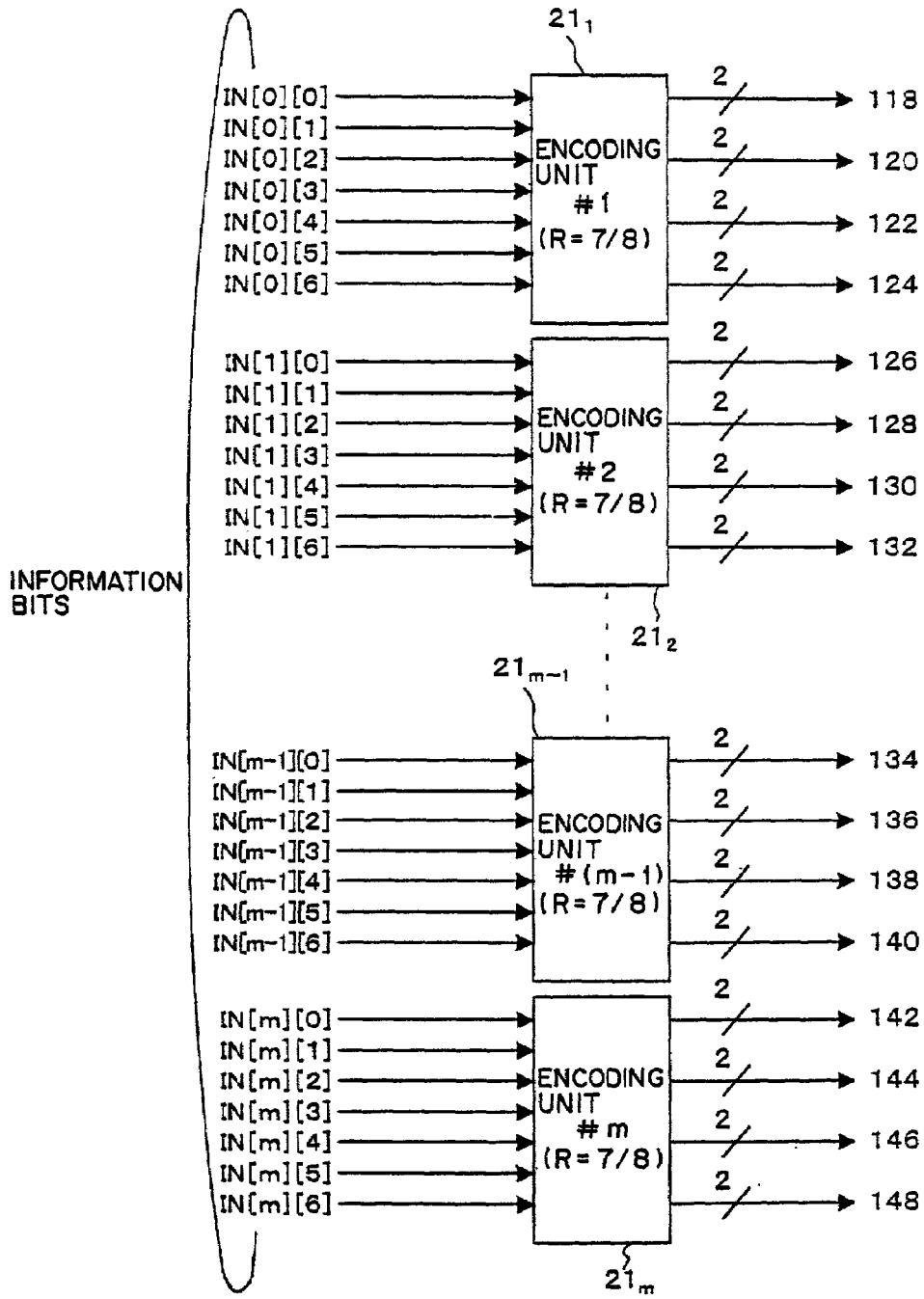
FIG. 10 shows the configuration of a 4n-sub-carrier encoder.

FIG. 10 shows the comprehensive configuration of the encoder in the case where the total number of sub-carriers is N=4m (m≧2). Each of encoding units $21_1$~$21_m$ has the same configuration as that of FIG. 8 or 9. As shown in FIG. 10, in an encoder corresponding to 4m-sub-carriers, the encoders shown in FIG. 8 are used in parallel and independently, and by providing each encoder with seven information bits, transmitting signals corresponding to the respective four sub-carriers are obtained.

FIG. 11 shows the basic configuration of a hard-decision decoder provided on the receiving side of a multi-carrier transmission system using four sub-carriers. The hard-decision decoder compares the 8-bit signal point patterns obtained from receiving signal data described above, with all 128 8-bit signal points that might be transmitted from the transmitting side, and when the 0s and 1s forming the content of the 8 bits are matched for each comparison, the decoder transmits a 7-bit signal pattern that generates the 8 bits as decoding data. The hard-decision decoder receives the receiving data signal as a signal of either 1 or 0 by setting a threshold value and inputs the signal to a demapping unit 23.

The hard-decision decoder shown in FIG. 11 comprises a demapping unit 23 demapping receiving data signals corresponding to sub-carriers #1~#4 and converting the signals into the 8-bit signal point patterns described above, that is, demapping signals $r_{1x}$, $r_{1y}$, $r_{2x}$, $r_{2y}$, $r_{3x}$, $r_{3y}$, $r_{4x}$ and $r_{4y}$ by excluding the MSB, a timing control unit 24 outputting information bits that might be transmitted from the transmitting side, that is, all patterns of the 7-bit IN0~IN6 (128 7-bit patterns) as a data control signal, an encoding unit 25 encoding the output of the timing control unit 24, generating 8-bit mapping signals $s_{1x}$, $s_{1y}$, $s_{2x}$, $s_{2y}$, $s_{3x}$, $s_{3y}$, $s_{4x}$ and $s_{4y}$ from 7-bit input information and outputting the signals, and having the same configuration as that of the encoding unit 9 shown in FIG. 8, a signal comparison unit 26 comparing the demapping signals with the mapping signals as the output of the encoding unit, that is, all the 128 signal point patterns described above and outputting a memory timing signal when the contents of the 8 bits are matched, and a data memory unit 27 storing the content of information bits IN0~IN6 as a data control signal outputted by the timing control unit 24 when a memory timing signal is outputted and outputting the stored content as a 7-bit decoding data signal when a multi-carrier symbol timing signal corresponding to the transmission time of four sub-carriers are inputted.

To this hard-decision decoder, both receiving data signals for four sub-carriers and a multi-carrier symbol timing signal that varies at multi-carrier symbol intervals are inputted and a decoding data signal is outputted. A receiving data signal is a complex signal (I-channel/Q-channel).

The demapping unit 23 converts the receiving data signal of each sub-carrier into a signal point pattern, that is, it performs an operation that is the reverse of the operation of the mapping unit and outputs the demapping signal of each sub-carrier. The timing control unit 24 outputs a total of 128 patterns of a signal corresponding to the 7-bit information data as a data control signal at intervals of one section of a multi-carrier symbol timing signal, and the encoding unit generates the 128 8-bit signal point patterns described above, that is, mapping signals, from the 7 bits.

When as a comparison result of the signal comparison unit 26, the demapping signals and mapping signals are matched and a memory timing signal to be outputted is activated, the data memory unit 27 stores a data control signal in an internal memory, synchronizes the signal with the multi-carrier symbol timing signal and outputs the stored data as a decoding data signal. Since the data stored in the internal memory is cleared at multi-carrier symbol intervals, the data control signal in the case where the demapping signals and mapping signals are matched is outputted as decoding signal data. However, if no pair of a demapping signal and a mapping signal as one of 128 patterns is matched, the memory timing signal is not activated and the data are not stored. In that case, the decoding data signal is a value in the case where the memory is cleared.

A hard-decision decoder in the case where the total number of sub-carriers is N=4m (m≧2) can be configured by using the decoders shown in FIG. 11 in parallel and independently, as shown in FIG. 10.

FIG. 12 shows the basic configuration of a soft-decision decoder provided on the receiving side of a multi-carrier transmission system using four sub-carriers. Although the hard-decision decoder performs the 0/1 comparison of each bit of a signal pattern, the soft-decision decoder calculates the code distance between a receiving data signal and a transmitting signal that might be transmitted from the transmitting side taking into consideration the noise of the receiving data signal and the like and outputting a data control signal corresponding to a transmitting signal with the shortest code distance as a decoding signal.

The soft-decision decoder comprises a timing control unit 30 corresponding to each of the timing control unit 24 and encoding unit 25 shown in FIG. 11, an encoding unit 31, a mapping unit 32 having the same configuration as that of the QPSK mapping unit 10 shown in FIG. 8, a code distance calculation unit 33, a code distance memory unit 35 storing a code distance outputted by the code distance calculation unit 33, a minimum distance memory unit 36 storing the minimum value of the code distance, a code distance comparison unit 34 comparing the code distance signal outputted by the code distance calculation unit 33 with the minimum distance signal stored in the minimum distance memory unit 36 and a data memory unit 37 outputting a decoding data signal. To the soft-decision decoder, receiving data signals for four sub-carriers, a multi-carrier symbol timing signal varying at multi-carrier symbol intervals and a distance access signal provided from an error correction unit, which is described later, and the like, are inputted, and both a decoding signal and a distance data signal are outputted. The receiving signal is a complex signal (I-channel/Q-channel).

The timing control unit 30 generates a 7-bit data control signal, that is, a total of 128 patterns, as is shown in FIG. 11. The timing control unit 30 also outputs the transition point of the data control signal as a timing control signal.

The encoding unit 31 generates mapping signals corresponding to four sub-carriers #1~#4, that is, 128 8-bit signal point patterns from the 7-bit data control signal, as shown in FIG. 8. The mapping unit 32 generates transmitting signals in possibility of transmission from the transmitting side in relation to four sub-carriers, as shown in FIG. 8, and outputs the signals to the code distance calculation unit 33.

The code distance calculation unit 33 calculates the code distance between an I-channel and a Q-channel in possibility of transmission from the transmitting side, and outputs the distance to both the code distance comparison unit 34 and code distance memory unit 35 as a code distance signal. This calculation is conducted in synchronization with a timing control signal outputted by the timing control unit 30.

Similarly, the code distance comparison unit 34 compares the code distance signal outputted in synchronization with the timing control signal by the code distance calculation unit 33 with the minimum distance signal already stored in the minimum distance memory unit 36, and activates the memory timing signal if the code distance signal outputted from the code distance calculation unit 33 is smaller than the minimum distance signal.

If the memory timing signal outputted by the code distance comparison unit 34 is activated, the minimum distance memory unit 36 transmits a code distance signal outputted by the code distance calculation unit 33 of an internal memory and outputs the data stored in the internal memory as a minimum distance signal to the code distance comparison unit 34 in synchronization with the timing control signal. Since the data stored in the internal memory is cleared when the multi-carrier symbol timing signal is inputted, the minimum code distance is stored in the internal memory at intervals of a multi-carrier symbol time.

The data memory unit 37 stores a corresponding data control signal in the internal memory when the memory timing signal is activated, and outputs the data corresponding to the minimum distance stored in the internal memory as a decoding data signal when the multi-carrier symbol timing signal is inputted. Since the data stored in the internal memory is cleared when the multi-carrier symbol timing signal is inputted, a data control signal corresponding to the minimum code distance, that is, a decoding data signal is stored in the internal memory at intervals of a multi-carrier symbol time.

Every time the code distance calculation unit 33 outputs a code distance signal, the code distance memory unit 35 stores the code distance signal when the data control signal is outputted by the timing control unit 30. Then, the code distance calculation unit 33 outputs the stored code distance signal as a distance data signal When a 7-bit distance access signal is inputted from, for example, an error correction unit, which is described later.

One operation of the code distance calculation unit 33 described above is described in detail below. For example, attention is focused on the I-channel of a receiving data signal. In this case, since the difference between actual values, 0.2, 0.6, 0.2 and 0.6, and 0, 0, 0 and 0 is 1.6, and the difference between actual values, 0.2, 0.6, 0.2 and 0.6, and 1, 1, 1 and 1 is 2.4, the code distance comparison unit 34 calculates the code distances to be 1.6 and 2.4, respectively. The code distances to be 1.6 and 2.4 are compared, 1.6 is stored in the minimum distance memory unit 36, 0, 0, 0 and 0 are provided if 1.6 is a minimum when 1.6 is compared with the output of another mapping unit 32, and the 7-bit control signal of the timing control unit 30 is stored in the data memory unit 37 as a decoding data signal.

A soft-decision decoder in the case where the total number of sub-carriers is N=4m (m≧2) can be configured by using the decoders shown in FIG. 12 in parallel and independently, as in shown in FIG. 10.

Since according to the encoding method of this preferred embodiment the minimum code distance is $d_{min}=d$ and there is no expansion of a code distance, the coding method has no error correction capability. If another error correction method is used together (in the case of connected codes), the encoding method corresponds to internal coding. Therefore, in order to display the capability of external coding 100 percent, for example, a distance data signal, which is a soft-decision information, must be provided to an error correction decoder provided in the later stage of a receiver as probability information. This is because when signals are wrongly decoded by this encoding method, the error correction of external coding by connected codes becomes inaccurate. Specifically, code distances corresponding to all of the 128 signal patterns generated at multi-carrier symbol intervals must be calculated and be inputted to the error correction decoder as probability information.

Figure 13:
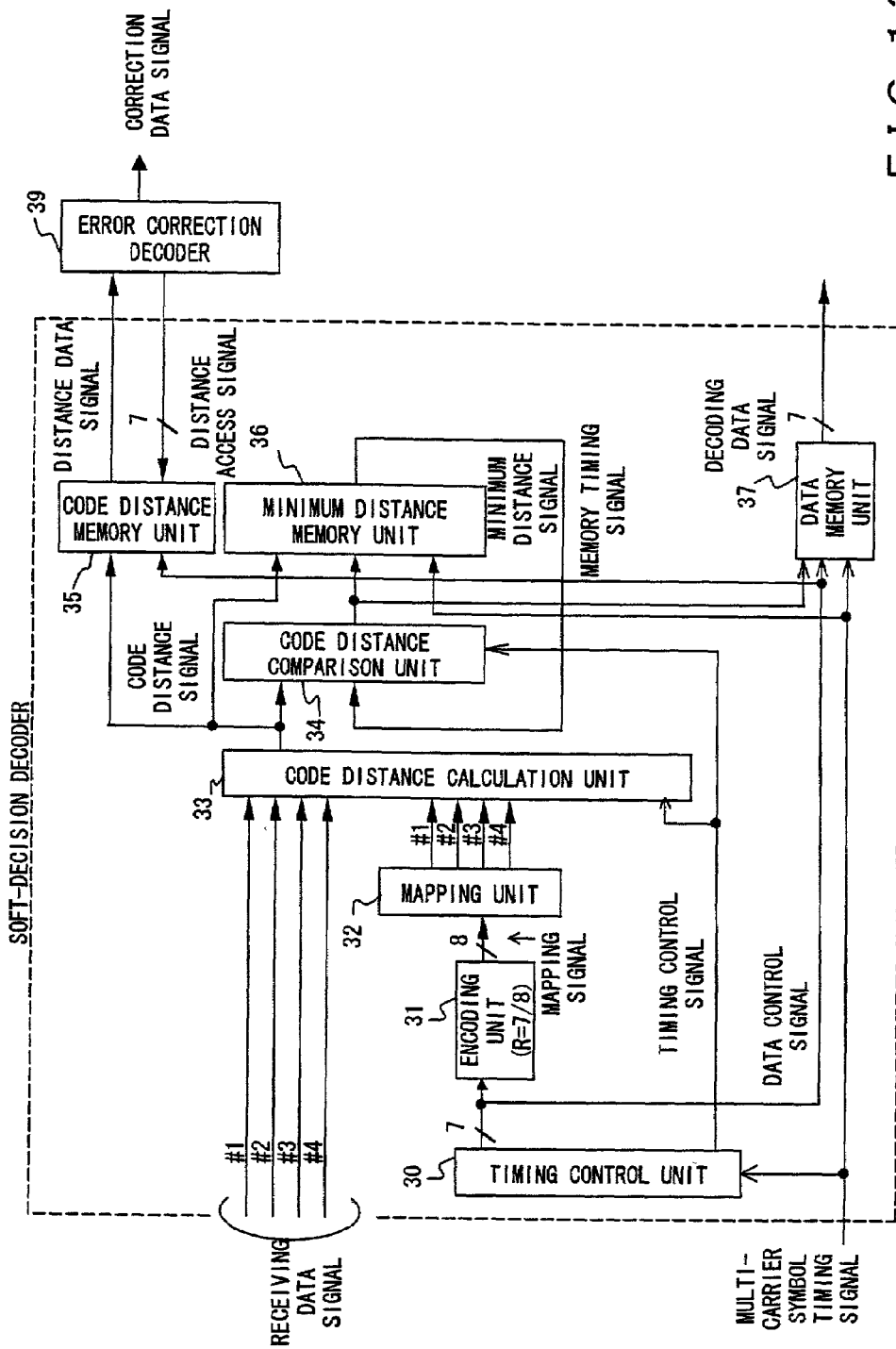
FIG. 13 shows the serial connection between a soft decision decoder and an error correction decoder.

FIG. 13 shows the connection configuration between a soft-decision decoder and an error correction decoder in such a case. In FIG. 13, an error correction decoder 39 is connected to the code distance memory unit 35 of the soft-decision decoder shown in FIG. 12 and outputs a 7-bit distance access signal to the code distance memory unit 35. The code distance memory unit 35 outputs a stored code distance signal to the error correction decoder 39 as a distance data signal. The error correction decoder 39 can access distance data which is probability information for error correction decoding by outputting a distance access signal at multi-carrier symbol intervals.

According to the encoding method of this preferred embodiment, as described earlier, encoding is performed at an encoding rate of R=⅞. Therefore, 8 bits of data are transmitted using four sub-carriers. Specifically, the information bits of a code word with a bit width of 256 patterns are 7 bits, that is, 128 patterns. Therefore, in the case of hard-decision decoding, there is sometimes no pattern which coincides with the code word on the receiving side due to the influence of fading or a thermal noise. Specifically, it is sometimes judged that receiving data are in 128 patterns other than the code word. The probability of this is ½. In this case, as described earlier, the memory timing signal shown in FIG. 11 is not activated.

In this preferred embodiment, although the probability is ½, it is judged whether eight types of signal patterns, except for signal patterns meeting condition (b) of the conditions shown in FIG. 3, include a demapping signal. If the demapping signal is not included, a receiving error can be detected by activating an error detection signal. By thus detecting a receiving error and using the receiving error as receiving error information, for example, in the higher-order layer in the latter stage of a decoder, an error correction/detection unit or the like, an overall throughput or a receiving characteristic can be improved.

Figure 14:
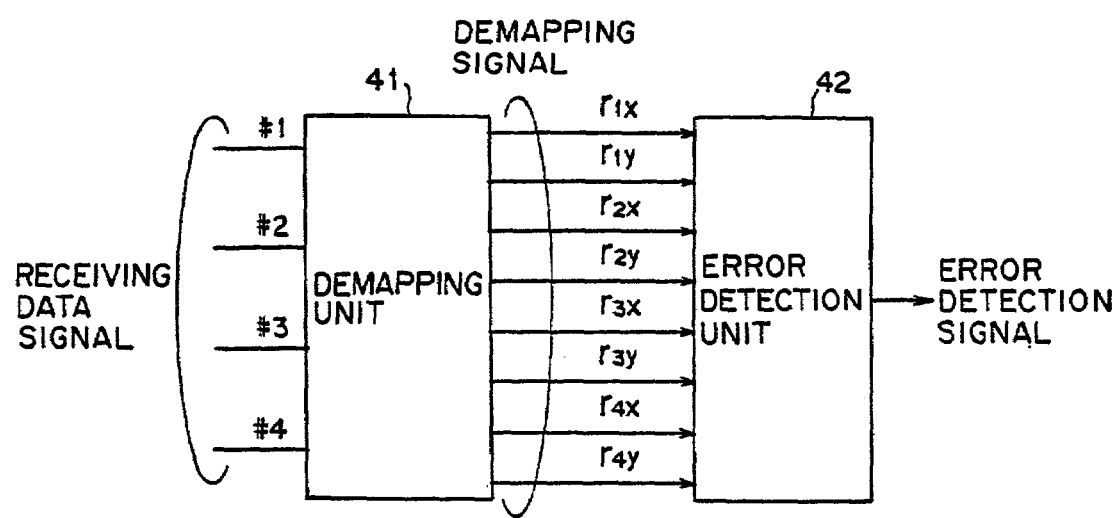
FIG. 14 shows the configuration of a four-sub-carrier receiving error detector.

FIG. 14 shows the basic configuration of a receiving error detector provided on the receiver side of a multi-carrier transmission system using four sub-carriers. In FIG. 14, to the receiving error detector, receiving data for four sub-carriers, that is, a complex signal (I-channel/Q-channel), are inputted, and an error detection signal is outputted.

In FIG. 14, a demapping unit 41 converts a receiving data signal into a signal pattern and outputs a demapping signal corresponding to the signal pattern, like the demapping unit 23 of the hard-decision decoder shown in FIG. 11.

An error detection unit 42 judges whether 128 types of signal patterns, except for those that meet condition (b) shown in FIG. 3, include a demapping signal. If the demapping signal is not included, the error detection unit 42 activates an error detection signal. Since there is no need to perform a matching process for all the patterns, there is almost no delay in time and the delay time is only several gates.

A receiving error detector in the case where the total number of sub-carriers is N=4m (m≧2) can be configured by using the detectors shown in FIG. 14 in parallel and independently. Alternatively, the logical product of the detection signals of a plurality of receiving error detectors can also be used as one error detection signal.

In FIG. 14, an error detection signal can be outputted from the error detection unit 42, with little delay time, after a receiving data signal is inputted. However, for example, in the hard decision decoder shown in FIG. 11, since a matching process with all the signal patterns that might be transmitted from the transmitting side is required, one multi-carrier symbol cycle is needed to output a decoding data signal. If a hard-decision decoder and a receiving error detector are used in parallel and independently, the hard-decision decoder does not terminate the decoding process even if the receiving error detector judges that the receiving signal is erroneously received.

FIG. 15 shows the parallel connection configuration between a hard-decision decoder and a receiving error detector, designed to continue the hard-decision decoding operation. The configuration of the hard-decision decoder shown in FIG. 15 is almost the same as that of the hard-decision detector shown in FIG. 11 except that a clock control unit 43 is added.

In FIG. 15, the hard-decision decoder and receiving error detector are connected in parallel. To the error detection unit 42 of the receiving error detector, the output of the demapping unit 23 of the hard-decision decoder is provided. When the error detection unit 42 outputs an error detection signal to the clock control unit 43, the clock control unit 43 exercises clock control so as to stop the operation of the hard-decision decoder. If an error detection signal is not activated, specifically, if an error is not detected, the clock control unit 43 exercises clock control so as to activate both the timing control unit 24 and data memory unit 27 of the hard-decision decoder.

The specific configurations of both the hard-decision and soft-decision decoders of this preferred embodiment are described in detail with reference to FIGS. 16 through 20. FIG. 16 shows the detailed configuration of a hard-decision decoder using four sub-carriers. Compared with that of the hard-decision decoder shown in FIG. 11, the timing control unit 24 comprises a counter 45. A 7-bit data control signal outputted by the counter 45 is incremented every time a master clock is inputted, and the counter 45 is cleared when a multi-carrier symbol timing signal is inputted.

A signal comparison unit 26 comprises eight EXOR gates $46_1$–$46_8$ and an OR gate 47. To each of the EXOR gates, respective bits corresponding to both a demapping signal outputted by a demapping unit 23 and a mapping signal outputted by a encoding unit 25 are inputted. When the values of the two input bits are different, the output becomes H. The inversion of the output of the OR gate 47 makes a memory timing signal H only when all the outputs of the eight EXOR gates $46_1$–$46_8$ are L, specifically, when all the two inputs of each EXOR gate are matched and the signal is outputted as the enable signal of a flip-flop (FF) 48 of the data memory unit 27. If this enable signal becomes H, a 7-bit data control signal is stored in the FF 48 as data when a master clock is inputted. The stored content of the FF 48 is outputted as a decoding signal when a multi-carrier symbol timing signal is inputted, and simultaneously the content is cleared.

Figure 17:
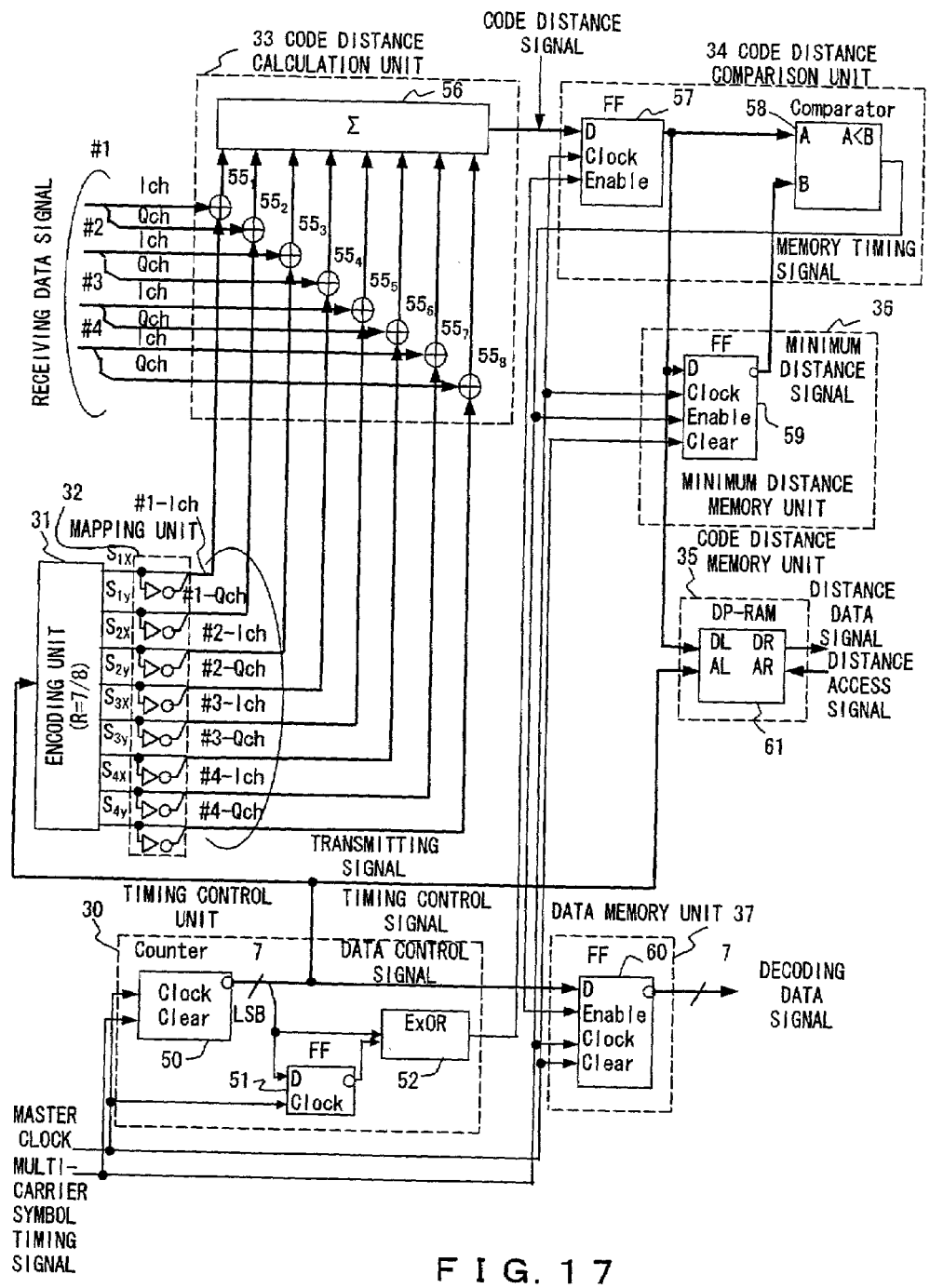
FIG. 17 shows one configuration of a four-sub-carrier soft decision decoder.

FIG. 17 shows the detailed configuration of a soft-decision decoder in the case where four sub-carriers are used. Compared with that of the soft-decision decoder shown in FIG. 12, first, a timing control unit 30 comprises a counter 50, an FF 51 and an EXOR gate 52. The operation of the counter 50 is the same as that of the counter 45 shown in FIG. 16. To the flip-flop 51, both the lowest-order bit LSB of a 7-bit data control signal outputted by the counter 50 and a master clock are inputted. To the EXOR gate 52, both this LSB and the output of the FF 51 are provided. At a specific time, the contents of both the LSB of a data control signal at the time and an LSB one clock before the current LSB are provided to the EXOR gate 52. The EXOR gate 52 outputs a timing control signal when an LSB changes, specifically, the data control signal changes. Then, this timing control signal is provided to the enable terminal of the flip-flop 57 in a code distance comparison unit 34.

A code distance calculation unit 33 calculates the difference between the respective factor data of the I-channel and Q-channel corresponding to each of the sub-carriers #1–#4 of a receiving data signal and the respective factor data of the I-channel and Q-channel corresponding to each of the sub-carriers #1–#4 that are outputted by a mapping unit 32 and that might be transmitted from the transmitting side, a summer 56 totals the results, and the result is outputted to the code distance comparison unit 34 as a code distance signal.

The code distance comparison unit 34 comprises a flip-flop 57 and a comparator 58. The FF 57 stores both a timing control signal outputted by the timing control unit 30 and a code distance signal outputted by the code distance calculation unit 33 when a master clock signal is inputted.

The stored code distance signal is compared with a minimum distance signal already stored in the flip-flop 59 of a minimum distance memory unit 36. If the value of the code distance signal stored in an FF 57 is smaller than that of the minimum distance signal, a memory timing signal outputted by the comparator 58 becomes H, and this signal is provided as the enable signal of both the FF 59 in the minimum distance memory unit 36 and the FF 60 in the data memory unit 37.

Then, the code distance signal outputted by the FF 57 of the code distance comparison unit 34 is stored in the FF 59 of the minimum distance memory unit 36 by a clock just after a clock when the memory timing signal was H, and simultaneously the data control signal outputted by the timing control unit 30 is stored in the FF 60 of the data memory unit 37.

When a multi-carrier symbol timing signal is inputted, the counter 50 of the timing control unit 30, the FF 59 of the minimum distance memory unit 36 and the FF 60 of the data memory unit 37 are all cleared, and the stored content of the FF 60 in the data memory unit 37 is outputted as a decoding data signal.

The dual port RAM 61 of the code distance memory unit 35 stores the output of the FF 57 in the code distance comparison unit 34 in a load address (AL) that the timing control signal outputted by the timing control unit 30 indicates, as load data. Access to the stored data is described with reference to FIG. 18.

Figure 18:
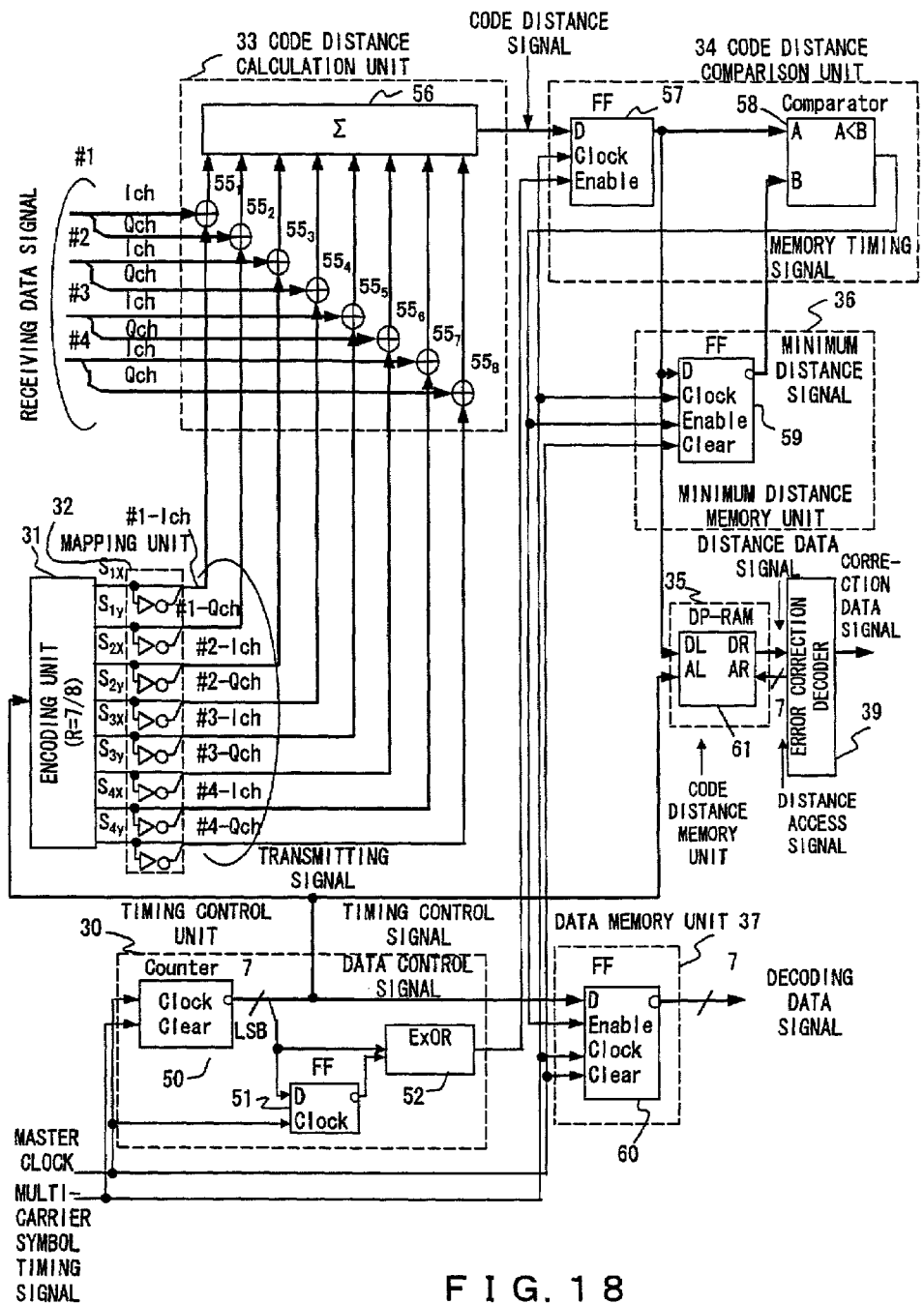
FIG. 18 shows one serial connection between a soft decision decoder and an error correction decoder.

FIG. 18 shows one detailed connection between the soft-decision decoder and error correction decoder, which are described with reference to FIG. 13. In FIG. 18, an error correction decoder 39 is connected to the code distance memory unit 39 shown in FIG. 17. The code distance memory unit 39 provides the same signal as the data control signal outputted by the timing control unit 30 as a distance access signal, that is, a read address (AR), receives data designated by the address as read data (DR), that is, a distance data signal, and outputs a correction data signal after correcting an error, if required.

Figure 19:
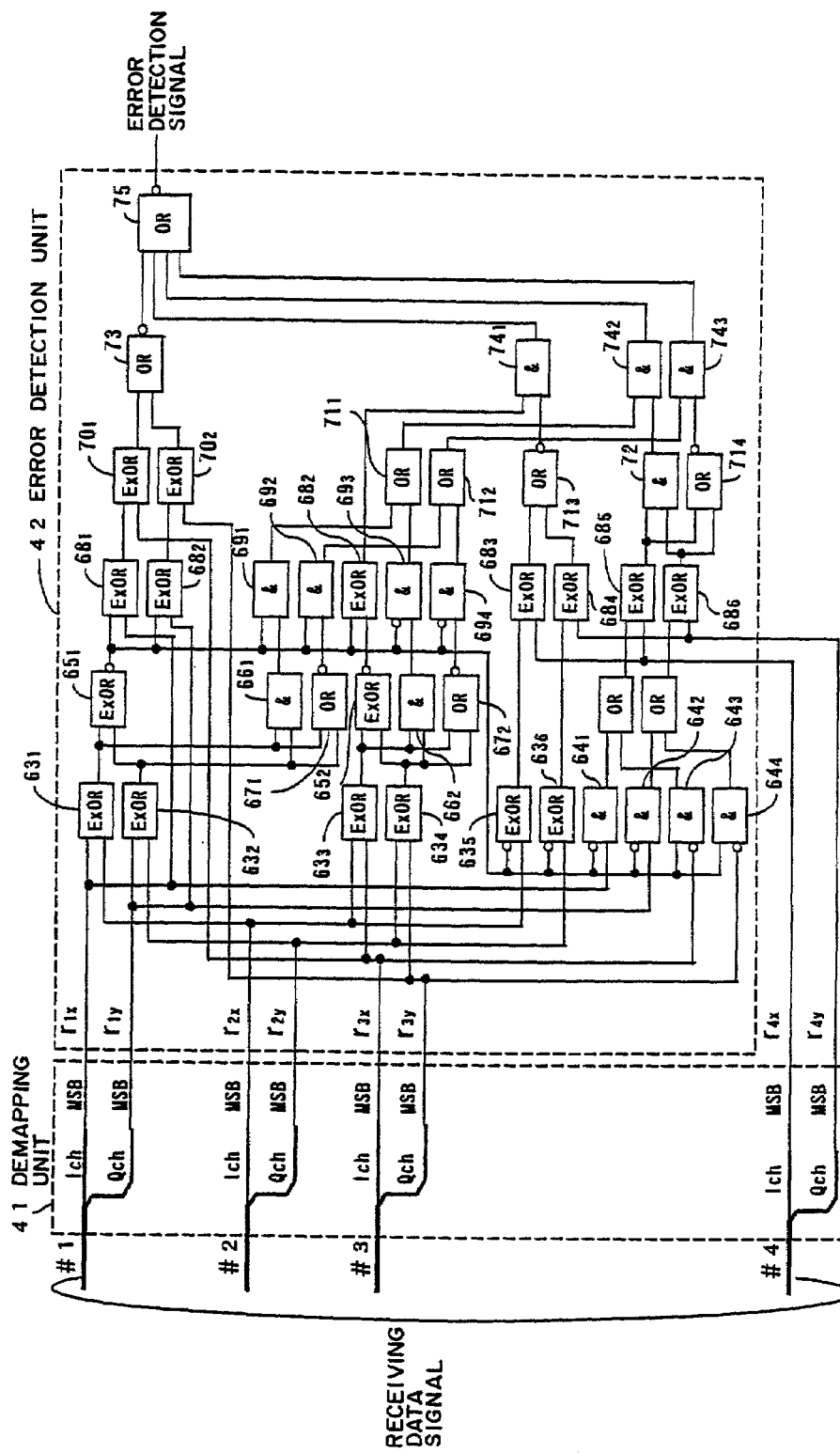
FIG. 19 shows one configuration of a four-sub-carrier receiving error detector.
Figure 21:
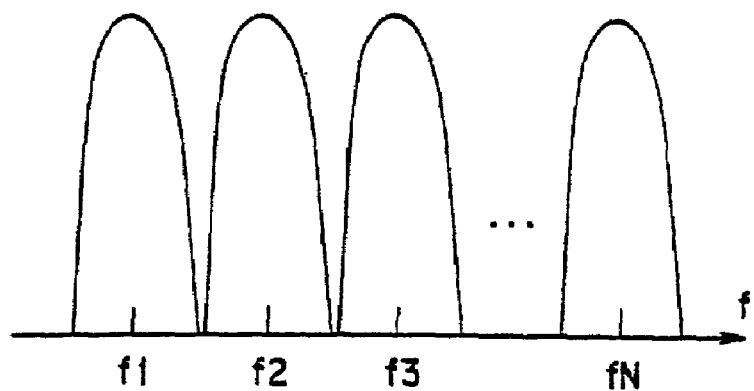
FIG. 21 shows a multi-carrier modulation system.
Figure 22:
FIG. 22 shows orthogonal frequency-division multiplexing.

FIG. 19 shows the detailed configuration of the receiving error detection decoder described with reference to FIG. 14.

For example, it is assumed that data $S_1$, $S_2$, $S_3$ and $S_4$ corresponding to the receiving phase data $\pi/4$, $\pi/4$, $\pi/4$ and $\pi/4$ of QPSK modulation are received. Since the peak power value is high, these are data that should not be transmitted from the transmitting side. In this case, since the outputs $r_{1x}$, $r_{1y}$, $r_{2x}$, $r_{2y}$, $r_{3x}$, $r_{3y}$, $r_{4x}$ and $r_{4y}$ of the demapping unit 41 all are 0, the output of an OR 73 is 0, the outputs of AND $74_1$, $74_2$ and $74_3$ all are 0, the output of an OR 75 becomes 1 and the receiving error detector outputs an error detection signal. The receiving error detector can also comprise a ROM formed by a table indicating the correspondence between the output of a demapping unit and an error detection signal.

FIG. 20 shows one detailed connection between the hard-decision decoder and receiving error detector described with reference to FIG. 15. Compared with that shown in FIG. 16, in FIG. 20, an AND gate 79 constituting a clock control unit 43 is added. An error detection signal outputted from a receiving error detector, which is not shown in FIG. 20, that is, the receiving error detector 42 shown in FIG. 15, is inputted to one negative logical input terminal of the AND gate 79. To the other input terminal of the AND gate 79, a master clock is inputted. If the error detection signal is L, the output of the AND gate 79 becomes the same as the master clock, and a normal master clock is provided to both the timing control unit 24 and data memory unit 27. However, if the error detection signal is H, the output of the AND gate 79 becomes L, and the operations of the timing control unit 24 and data memory unit 27 are stopped.

The effects of the multi-carrier transmission system according to the present invention described above are summarized as follows.

If, in a system commonly amplifying a plurality of sub-carriers (N=4m:m>1), for example, each carrier performs QPSK modulation, 1. by using a simple encoding algorithm (FIG. 3) using two groups of orthogonal QPSK signals, a peak power suppression amount 2 dB, which is a logical limit in four sub-carriers, can be implemented while implementing a high encoding rate (low redundancy) R=⅞;

2. by providing both a two-sub-carrier generation unit and a QPSK mapping unit, coding for enabling high-speed signal processing by a fully logical circuit can be implemented;
3. by providing a demapping unit, a timing control unit, an encoding unit, a signal comparison unit and a data memory unit, the hard-decision decoding of the encoded codes for enabling high-speed signal processing by a fully logical circuit can be implemented;
4. by a timing control unit, an encoding unit, a mapping unit, a code distance calculation unit, a code distance comparison unit, a minimum distance memory unit, a code distance memory unit and a data memory unit, the soft-decision decoding of the encoded codes for enabling high-speed signal processing by a fully logical circuit can be implemented; and
5. by providing a shared memory between a soft-decision decoding unit and an error correction decoding unit, probability information can be transmitted through a memory and the most appropriate decoding can be implemented by using an error correction method.

Furthermore, if hard-decision decoding is conducted in a system provided with the encoder described above, in order to implement high quality by error detection,
6. by judging whether a mapping signal is included in the conditions shown in FIG. 3 of claim 1 and activating an error detection signal if the mapping signal is not included, an error can be detected for every four sub-carriers;
7. by providing both a demapping unit and an error detection unit, error detection can be implemented; and
8. by incorporating a hard-decision decoder in a clock control unit and by stopping the decoding process when an error is detected, power consumption can be reduced.

As described above, in the transmitter, receiver and transmitting method of the multi-carrier transmission system of the present invention, communications can be conducted without using a signal pattern, the peak power of a transmitting signal becomes large, and high-quality wireless transmission, the characteristic degradation of which is minimized, can be implemented. By matching the system to a QPSK modulation method, the present invention is also applicable to most current commercially available wireless systems.

What is claimed is:

1. A transmitter in a multi-carrier transmission system for conducting communications using a modulation method for dividing a transmission band into a plurality of sub-carriers and mapping each sub-carrier using a complex signal point expressed by k bits, comprising: an encoding unit converting transmitting data information, the number of bits of which is smaller than kn bits, which are data used to express n sub-carriers, into a signal point pattern, in which the peak power of a transmitting signal is small, of signal point patterns expressed by the kn bits, the encoding unit further comprising a sub-carrier generation unit generating sub-carriers composed of signal points in which the signal point pattern with a small peak power is divided into two orthogonal groups in four quadrants of an IQ plane and in which the signal point of the part of sub-carriers has a prescribed correlation with a signal point of another sub-carrier; and
a mapping unit generating transmitting signals of n sub-carriers using an output of the encoding unit.

2. The transmitter in a multi-carrier transmission system according to claim 1, wherein
said sub-carrier generation unit generates sub-carriers with a phase condition in which, of 2 k signal points of a modulation signal, a part of the signal points is dependent on another sub-carrier.

3. The transmitter in a multi-carrier transmission system according to claim 2, wherein
said sub-carrier generation unit generates sub-carriers in which, of four signal points of a QPSK signal, the signal point of the part of sub-carriers is dependent on the signal point of another sub-carrier.

4. The transmitter in a multi-carrier transmission system according to claim 3, wherein
said encoding unit suppresses the peak power to almost 2 dB at an encoding rate of 7/8 by generating eight sub-carrier mapping signals from seven information bits.

5. The transmitter in a multi-carrier transmission system according to claim 2, wherein
said sub-carrier generation unit comprises a logical circuit.

6. The transmitter in a multi-carrier transmission system according to claim 2, wherein
said sub-carrier generation unit comprises a ROM.

7. A four-sub-carrier transmitter for 4m sub-carriers providing m transmitters, each of which comprises both the said encoding unit and mapping unit according to claim 1, in parallel and independently.

8. A receiver in a multi-carrier transmission system for conducting communications using a modulation method for dividing a transmission band into a plurality of sub-carriers and mapping each sub-carrier using a complex signal point expressed by k bits, comprising:
a demapping unit converting receiving signals obtained by converting transmitting data information, the number of bits of which is smaller than kn bits, which are data used to express n sub-carriers, into a signal point pattern, in which the peak power of a transmitting signal is small, of signal point patterns expressed by the kn bits and transmitted from a transmitting side;
a mapping signal generation unit generating all signal point patterns that might be transmitted from the transmitting side; and
a hard-decision decoding unit further comprising a comparison unit comparing signal point patterns of an output of the demapping unit with signal point patterns of an output of the mapping signal generation unit and an output unit outputting data corresponding to one signal point pattern, in which the signal point pattern outputted from the demapping unit and the signal point pattern outputted from the mapping signal generation unit are matched.

9. The receiver in a multi-carrier transmission system according to claim 8, wherein said mapping signal generation unit further comprises:
a timing control unit, including a counter sequentially generating information bits of less than 2 k when decoding n sub-carrier signals;
an encoding unit inputting information bits outputted from a timing control unit and converting the information bits into a signal point pattern, in which the peak power of a transmitting signal is small, of signal point patterns expressed by 2 k bits, the encoding unit further comprising a sub-carrier generation unit generating sub-carriers composed of signal points in which the signal point pattern with small peak power is divided into two orthogonal groups in four quadrants of an IQ plane and in which a signal point of a part of sub-carriers has a prescribed correlation with a signal point of another sub-carrier.

10. The receiver in a multi-carrier transmission system according to claim 9, further comprising:
- a transmission error detection unit detecting a transmission error when detecting a receiving signal that does not belong to any of the signal point patterns that might be transmitted from a transmitting side, of outputs of said demapping unit; and
- a decoding operation stoppage control unit stopping a decoding operation by said hard-decision decoding unit when said transmission error detection unit detects a transmission error.

11. A receiver in a multi-carrier transmission system for conducting communications using a modulation method for dividing a transmission band into a plurality of sub-carriers and mapping each sub-carrier using a complex signal point expressed by k bits, comprising:
- a demapping unit converting a receiving signal obtained by converting transmitting data information, the number of bits of which is smaller than kn bits, which are data used to express n sub-carriers, into a signal point pattern, in which the peak power of a transmitting signal is small, of signal point patterns expressed by the kn bits and transmitted from a transmitting side by a sub-carrier composed of signal points in which the signal point pattern with small peak power is divided into two orthogonal groups in four quadrants of an IQ plane and in which a signal point of a part of sub-carriers has a prescribed correlation with a signal point of another sub-carrier, into a demapping signal used to be compared with all signal point patterns that might be transmitted from the transmitting side;
- a transmission error detection unit detecting a transmission error when detecting a receiving signal that does not belong to any of the signal point patterns that might be transmitted from the transmitting side, of outputs of the demapping unit.

12. The receiver in a multi-carrier transmission system according to claim 11, wherein said error detection unit comprises a logical circuit.

13. The receiver in a multi-carrier transmission system according to claim 11, wherein said error detection unit comprises a ROM.

14. A receiver in a multi-carrier transmission system for conducting communications using a modulation method for dividing a transmission band into a plurality of sub-carriers and mapping each sub-carrier using a complex signal point expressed by k bits, comprising:
- a mapping unit mapping all signal point patterns that can be expressed by kn bits in relation to n sub-carriers and that might be transmitted from a transmitting side in order to convert the signal point patterns into respective transmitting signals of n sub-carriers, as in the transmitting side and outputting a transmission availability signal; and
- a soft-decision decoding unit further comprising an output unit outputting a signal point pattern before the mapping of a transmission availability signal with the shortest code distance of code distances between a receiving signal obtained by converting transmitting data information, the number of bits of which is smaller than kn bits, which are data used to express n sub-carriers, into a signal point pattern, in which the peak power of a transmitting signal is small, of signal point patterns expressed by the kn bits and transmitted from a transmitting side by a sub-carrier composed of signal points in which the signal point pattern with small peak power can be divided into two orthogonal groups in four quadrants of an IQ plane and having a sub-carrier generation unit generating sub-carriers in which a signal point of a part of sub-carriers has a prescribed correlation with a signal point of another sub-carrier, and all the transmission availability signals as a decoding signal.

15. The receiver in a multi-carrier transmission system according to claim 14, wherein said output unit further comprising:
- a code distance calculation unit calculating a distance between a receiving data signal and an output of said mapping unit;
- a minimum distance memory unit storing a minimum code distance;
- a code distance comparison unit comparing an output of the minimum distance memory unit and an output of the code distance calculation unit and updating said minimum distance memory unit when a code distance is shorter than the distance stored in the minimum distance memory unit; and
- a memory unit outputting data corresponding to the minimum distance as decoding data.

16. The receiver in a multi-carrier transmission system according to claim 11, further comprising
- an error correction decoding unit performing error correction decoding of a receiving data signal using code distances between the receiving signal and all the transmission availability signals.

17. A transmitting method in a multi-carrier transmission system for conducting communications using a modulation method for dividing a transmission band into a plurality of sub-carriers and mapping each sub-carrier using a complex signal point expressed by k bits, comprising:
- generating a sub-carrier composed of signal points in which the signal point pattern with small peak power can be divided into two orthogonal groups in four quadrants of an IQ plane and has a sub-carrier generation unit generating sub-carriers in which a signal point of a part of sub-carriers has a prescribed correlation with a signal point of another sub-carrier when converting receiving signals obtained by converting transmitting data information, the number of bits of which is smaller than kn bits, which are data used to express n sub-carriers, into a signal point pattern, in which the peak power of a transmitting signal is small, of signal point patterns expressed by the kn bits; and
- generating transmitting signals by mapping the encoding result.

18. A receiving method in a multi-carrier transmission system for conducting communications using a modulation method for dividing a transmission band into a plurality of sub-carriers and mapping each sub-carrier using a complex signal point expressed by k bits, comprising:
- converting a receiving signal obtained by converting transmitting data information, the number of bits of which is smaller than kn bits, which are data used to express n sub-carriers, into a signal point pattern, in which the peak power of a transmitting signal is small, of signal point patterns expressed by the kn bits and transmitted from a transmitting side by a sub-carrier composed of signal points in which the signal point pattern with small peak power can be divided into two orthogonal groups in four quadrants of an IQ plane and having a sub-carrier generation unit generating sub-carriers in which a signal point of a part of sub-carriers has a prescribed correlation with a signal point of another sub-carrier, into demapping signals (demapping step);

generating all signal point patterns that might be transmitted from the transmitting side (mapping signal generation step); and comparing signal point patterns of an output of the demapping step and signal point patterns of an output of the mapping signal generation step (comparison step) and outputting the transmitting data information corresponding to one signal point pattern, in which the signal point pattern outputted from the demapping unit and the signal point pattern outputted from the mapping signal generation unit are matched, as a decoding data signal.

19. A receiving method in a multi-carrier transmission system for conducting communications using a modulation method for dividing a transmission band into a plurality of sub-carriers and mapping each sub-carrier using a complex signal point expressed by k bits, comprising:

mapping all signal point patterns that can be expressed by kn bits in relation to n sub-carriers and that might be transmitted from a transmitting side in order to convert the signal point patterns into respective transmitting signals of n sub-carriers, as in the transmitting side and outputting a transmission availability signal (mapping step); and outputting the signal point pattern before mapping of the transmission availability signal with the shortest code distance of code distances between a receiving signal obtained by converting transmitting data information, the number of bits of which is smaller than kn bits, which are data used to express n sub-carriers, into the signal point pattern, in which the peak power of a transmitting signal is small, of signal point patterns expressed by the kn bits and transmitted from a transmitting side by a sub-carrier composed of signal points in which the signal point pattern with small peak power can be divided into two orthogonal groups in four quadrants of an IQ plane and having a sub-carrier generation sub-unit generating sub-carriers in which the signal point of a part of sub-carriers has a prescribed correlation with the signal point of another sub-carrier, and all the transmission availability signals as a decoding signal (output step) (soft-decision decoding step).

20. A transmitter in a multi-carrier transmission system for conducting communications using a modulation method for dividing a transmission band into a plurality of sub-carriers and mapping each sub-carrier using a complex signal point expressed by k bits, comprising:

an encoding unit converting transmitting data information, the number of bits of which is smaller than kn bits, which are data used to express n sub-carriers, into a signal point pattern, in which the peak power of a transmitting signal is small, of signal point patterns expressed by the 2 k bits, the encoding unit further comprising a sub-carrier generation unit generating the sub-carrier in which the signal point with small peak power can be divided into two orthogonal groups in four quadrants of an IQ plane and in which the signal point of a part of sub-carriers has a prescribed correlation with the signal point of another sub-carrier.

* * * * *